(12) United States Patent
Saji

(10) Patent No.: US 10,384,279 B2
(45) Date of Patent: Aug. 20, 2019

(54) TOOL, ADJUSTMENT MECHANISM, TOOL BODY AND CUTTING TOOL

(71) Applicant: TUNGALOY CORPORATION, Fukushima (JP)

(72) Inventor: Ryuichi Saji, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 71 days.

(21) Appl. No.: 15/524,272

(22) PCT Filed: Jul. 4, 2016

(86) PCT No.: PCT/JP2016/069730
§ 371 (c)(1),
(2) Date: May 4, 2017

(87) PCT Pub. No.: WO2017/010328
PCT Pub. Date: Jan. 19, 2017

(65) Prior Publication Data
US 2017/0326659 A1    Nov. 16, 2017

(30) Foreign Application Priority Data

Jul. 10, 2015    (JP) .................. 2015-138323

(51) Int. Cl.
*B23C 5/00*    (2006.01)
*B23C 5/24*    (2006.01)
(Continued)

(52) U.S. Cl.
CPC ............. *B23C 5/2424* (2013.01); *B23C 5/06* (2013.01); *B23C 5/2479* (2013.01); *B23C 9/00* (2013.01);
(Continued)

(58) Field of Classification Search
CPC .......... B23B 29/03489; B23C 2245/00; B23C 2260/52; B23C 5/24; Y10T 408/858
See application file for complete search history.

(56) References Cited

U.S. PATENT DOCUMENTS 1,746,381 A * 2/1930 Davis ................. B23B 29/0341
                                                    408/153
3,262,184 A * 7/1966 Sweeny .............. B23B 29/0341
                                                    407/73
(Continued)

FOREIGN PATENT DOCUMENTS

CN    104520038 A    4/2015
DE    209 347 A3     4/1984
(Continued)

OTHER PUBLICATIONS

International Search Report PCT/JP2016/069730, dated Aug. 9, 2016.
(Continued)

*Primary Examiner* — Willmon Fridie, Jr.
(74) *Attorney, Agent, or Firm* — Studebaker & Brackett PC

(57) ABSTRACT

A cutting insert which is suitable for high cutting speed, a tool body thereof and a tool are provided. A tool according to the present invention is a tool in which a leading end thereof is provided with a force transmitting portion and for which a rotational axis extending from the leading end to a base end thereof is defined, wherein the tool comprises a cam portion which is arranged closer to the base end than the force transmitting portion and for which a dimension from the rotational axis of the tool varies in accordance with an angle at which the cam portion is rotated around the rotational axis.

19 Claims, 27 Drawing Sheets

(51) Int. Cl.
*B23C 9/00* (2006.01)
*B25B 13/48* (2006.01)
*B23C 5/06* (2006.01)
*B25B 15/00* (2006.01)

(52) U.S. Cl.
CPC ............ *B25B 13/48* (2013.01); *B25B 15/005* (2013.01); *B23C 2210/161* (2013.01); *B23C 2260/52* (2013.01)

(56) References Cited

U.S. PATENT DOCUMENTS

| | | | | |
|---|---|---|---|---|
| 3,802,043 | A * | 4/1974 | Garih | B23C 5/2444 407/36 |
| 4,018,542 | A * | 4/1977 | Lindsay | B23B 29/0341 408/153 |
| 4,024,615 | A * | 5/1977 | Lieser | B23C 5/2444 407/47 |
| 4,964,763 | A * | 10/1990 | Kieninger | B23C 5/207 407/101 |
| 5,454,667 | A * | 10/1995 | Cirino | B23B 29/0341 408/153 |
| 5,482,417 | A | 1/1996 | Erickson | |
| 6,000,888 | A | 12/1999 | Hartman | |
| 6,030,153 | A | 2/2000 | Votsch et al. | |
| 7,287,938 | B2 * | 10/2007 | Raab | B23B 29/03417 407/37 |
| 9,827,621 | B2 * | 11/2017 | Hughes | B23C 5/06 |
| 2013/0022414 | A1 * | 1/2013 | Athad | B23C 5/006 407/44 |
| 2015/0217384 | A1 | 8/2015 | Saji | |

FOREIGN PATENT DOCUMENTS

| | | |
|---|---|---|
| EP | 2881202 A1 | 6/2015 |
| JP | H08-187670 A | 7/1996 |
| JP | 2001-025914 A | 1/2001 |
| WO | 03/092969 A1 | 11/2003 |

OTHER PUBLICATIONS

The extended European search report issued by the European Patent Office dated Jul. 4, 2018, which corresponds to European Patent Application No. 16824308.7-1019 and is related to U.S. Appl. No. 15/524,272.

* cited by examiner

TOOL, ADJUSTMENT MECHANISM, TOOL BODY AND CUTTING TOOL

TECHNICAL FIELD

The present invention relates to a tool to be used for the positional adjustment of a component. The present invention further relates to, as to a cutting tool on which a cutting insert is removably mounted, an adjustment mechanism which adjusts the position of a cutting edge of the cutting insert. In particular, the present invention relates to a tool comprising a configuration for the positional adjustment of a cutting edge, an adjustment mechanism comprising a configuration corresponding to such tool, a tool body and a cutting tool comprising such tool body.

BACKGROUND ART

A conventional cutting tool which is capable of adjusting the position of a cutting edge is disclosed in Patent Document 1. Patent Document 1 discloses a rotary cutting tool which comprises a plurality of cutting inserts and also comprises a tool body having insert mounting parts on each of which, respectively, such cutting inserts are removably mounted. This rotary cutting tool employs an adjustment component (wedge-shaped member) for adjusting the position of a cutting edge of a cutting insert and also employs a wedge component for fixing a cutting insert. The cutting insert has an inclined side surface which is pressed by an inclined surface of the adjustment component such that the position of the cutting edge is varied. By operating a right-and-left screw which is screwed into a threaded hole of the adjustment component, the position of the adjustment component can be adjusted in a direction in which the wedge component is not arranged, whereby the position of the cutting edge is adjusted. It should be noted that various tools may be used in order to operate the right-and-left screw for the cutting tool of Patent Document 1. For example, in addition to a conventional and general-purpose driver or wrench, it may be possible to use the T-type wrench disclosed in Patent Document 2.

Meanwhile, various kinds of tools have been proposed conventionally. For example, Patent Document 2 discloses a T-type wrench which is provided with, at an intermediate part thereof, a press plate in order to increase an axial-directional force of pressing a bolt, etc., and thereby to facilitate the fastening of such bolt, etc. This press plate is a member for pressing, by hand, the wrench in the axial direction so as to prevent the wrench from being disengaged from the bolt, etc.

CITATION LIST

Patent Document

Patent Document 1: JP2001-025914 A
Patent Document 2: JPH08-187670 A

SUMMARY

Technical Problem

As to the rotary cutting tool of Patent Document 1, the position of a cutting edge can be adjusted, but multiple members, including the adjustment component and the right-and-left screw, are arranged in an outer peripheral part of the cutting tool. These members are operated to adjust the position of the cutting edge, and the position or state is set in accordance with a desired position of the cutting edge. Thus, depending on the position of the adjustment component, etc., the dynamic balance of the rotary cutting tool will be lost, i.e., the symmetry of the rotary cutting tool will be disrupted about a rotational axis thereof. The inequality of the dynamic balance causes the generation of vibration, etc., when a cutting speed is increased. Therefore, a rotary cutting tool to be used at high speed is required to involve a high level of dynamic balance.

One of the objects of the present invention is, in a cutting tool, to adjust the position of a cutting edge without impairing the dynamic balance.

Solution to Problem

A tool according to the present invention is a tool in which a leading end thereof is provided with a force transmitting portion and for which a rotational axis extending from the leading end to a base end thereof is defined, wherein the tool further comprises a cam portion which is arranged closer to the base end than the force transmitting portion and for which a dimension from the rotational axis of the tool varies in accordance with an angle at which the cam portion is rotated around the rotational axis.

An adjustment mechanism according to the present invention is an adjustment mechanism for adjusting a position of a cutting edge of a cutting insert which is removably mounted on an insert mounting part of a tool body or a cartridge in a cutting tool. Such adjustment mechanism comprises a tool for which a rotational axis extending from a leading end thereof to a base end thereof is defined, the tool comprising a cam portion for which a dimension from an outer peripheral surface of the tool to the rotational axis varies in accordance with an angle at which the cam portion is rotated around the rotational axis. Such adjustment mechanism comprises an engagement part which is provided so as to be adjacent to the insert mounting part or the cartridge in the tool body and which is configured so as to be capable of being engaged with the tool such that the tool is capable of being rotated around the rotational axis. In a state in which the cutting insert or the cartridge is arranged so as to be movable, the tool is rotated in the engagement part around the rotational axis, whereby the cam portion acts so as to move the cutting insert or the cartridge.

A tool body of a cutting tool according to the present invention is a tool body of a cutting tool comprising an insert mounting part on which a cutting insert is removably mounted, and a fixing member for fixing the cutting insert to the insert mounting part is used. Further, a tool is used in order to fix the cutting insert. Such tool is a tool which has a force transmitting portion for imparting a force to a fixing member, the tool comprising a cam portion for which a dimension from an outer peripheral surface of the tool to the rotational axis extending from a leading end of the tool to a base end thereof varies in accordance with an angle at which the cam portion is rotated around the rotational axis, the cam portion being closer to the base end than the force transmitting portion. The tool body comprises an engagement part which is capable of being engaged with the tool such that the tool is capable of being rotated around the rotational axis. In a state in which the cutting insert is arranged so as to be movable in the insert mounting part, the tool is rotated in the engagement part around the rotational axis, whereby the cam portion acts so as to move the cutting insert.

A cutting tool according to the present invention comprises the tool body according to the present invention and a cutting insert which is removably mounted on an insert mounting part of the tool body.

Advantageous Effects of Invention

The cutting tool according to the present invention allows for the positional adjustment of a cutting edge without impairing dynamic balance.

DESCRIPTION OF EMBODIMENTS

Embodiments of the present invention will now be described as appropriate with reference to the attached drawings.

Figure 1:
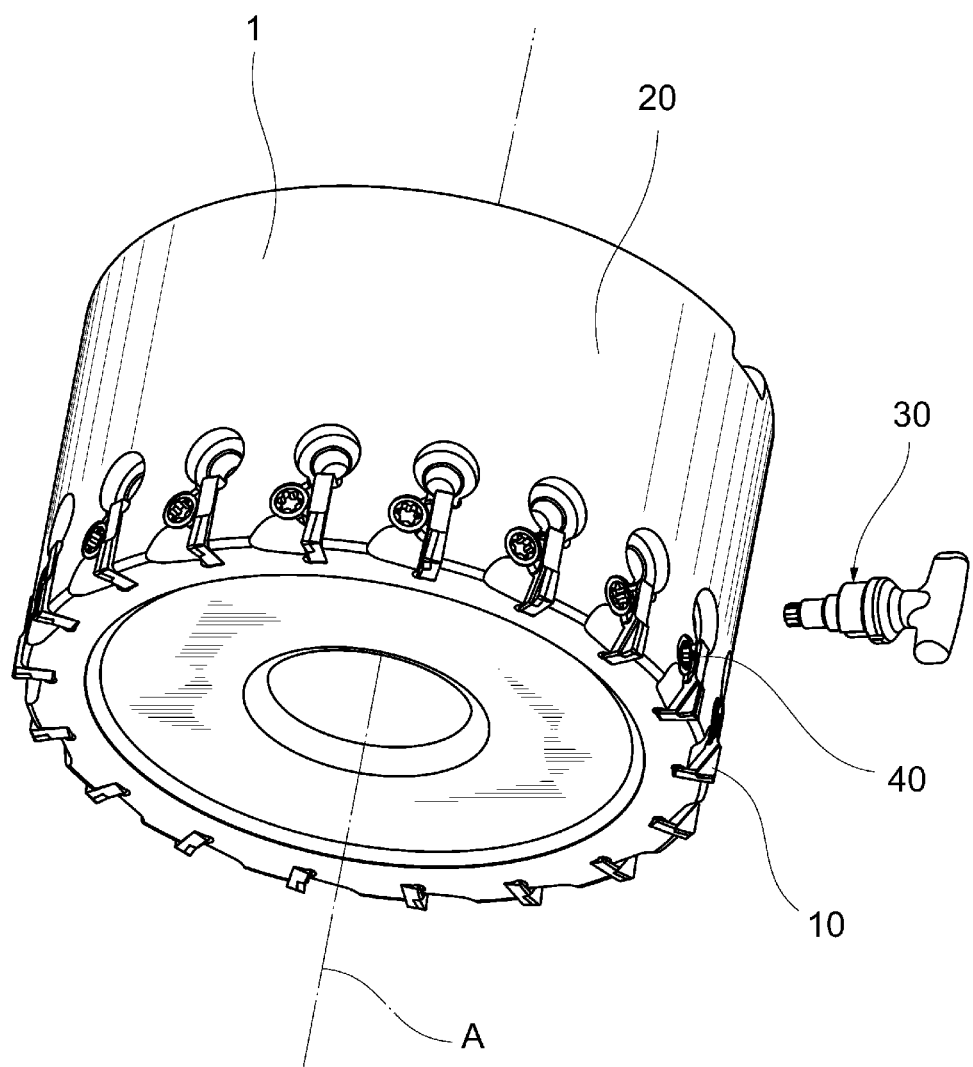
FIG. 1 is a perspective view of a cutting tool and a tool in an embodiment of the present invention.

As shown in FIG. 1, a cutting tool 1 according to an embodiment of the present invention comprises a plurality of cutting inserts 10, a tool body 20 on which each of the cutting inserts 10 is removably mounted, and a plurality of fixing members (fastening screws) 40, each of which fixes a respective cutting insert 10 to the tool body 20. The cutting tool 1 is a rotary cutting tool (milling tool) which cuts a workpiece while being rotated around a rotational axis A.

The cutting tool 1 comprises an adjustment mechanism for adjusting (aligning) the position of a cutting edge 11 of the cutting insert 10 removably mounted on an insert mounting part 21 of the tool body 20. As will be apparent from the following description, the adjustment mechanism comprises a tool 30 and an engagement part (guide recessed part) 22 associated with the insert mounting part 21 of the tool body 20. The tool 30 comprises a cam portion 32 for which a dimension from an outer peripheral surface of the tool 30 to a rotational axis B gradually varies in accordance with an angle at which the cam portion 32 is rotated around the rotational axis B. Further, in such adjustment mechanism, this tool 30 is engaged with the engagement part 22 of the tool body 20 and is then rotated around the rotational axis B, so that the cam portion 32 acts on the cutting insert 10, whereby the position of the cutting edge 11 of the cutting insert 10 can be varied in accordance with the state or direction of the cam portion 32. A cutting tool comprising this adjustment mechanism will be described below in detail. The tool 30 will firstly be described.

Figure 2:
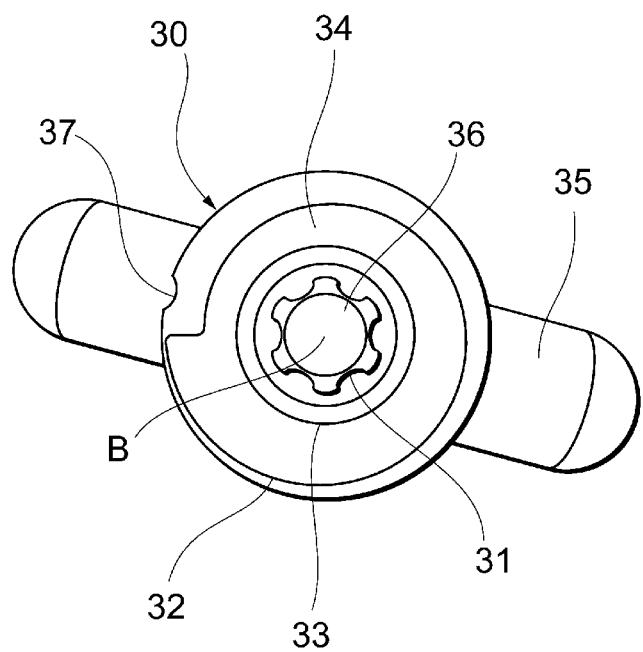
FIG. 2 is a front view of the tool of FIG. 1.
Figure 3:
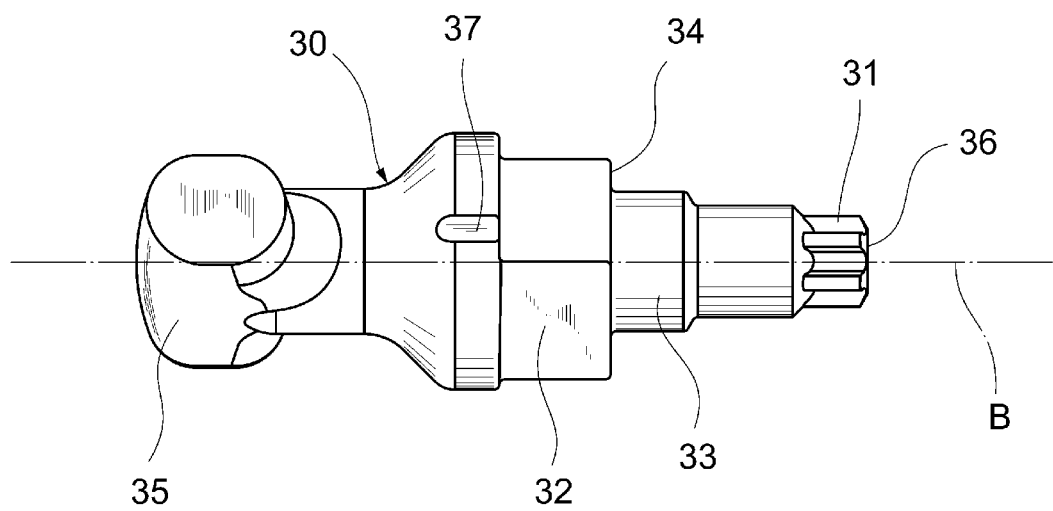
FIG. 3 is a left side view of the tool of FIG. 1.
Figure 4:
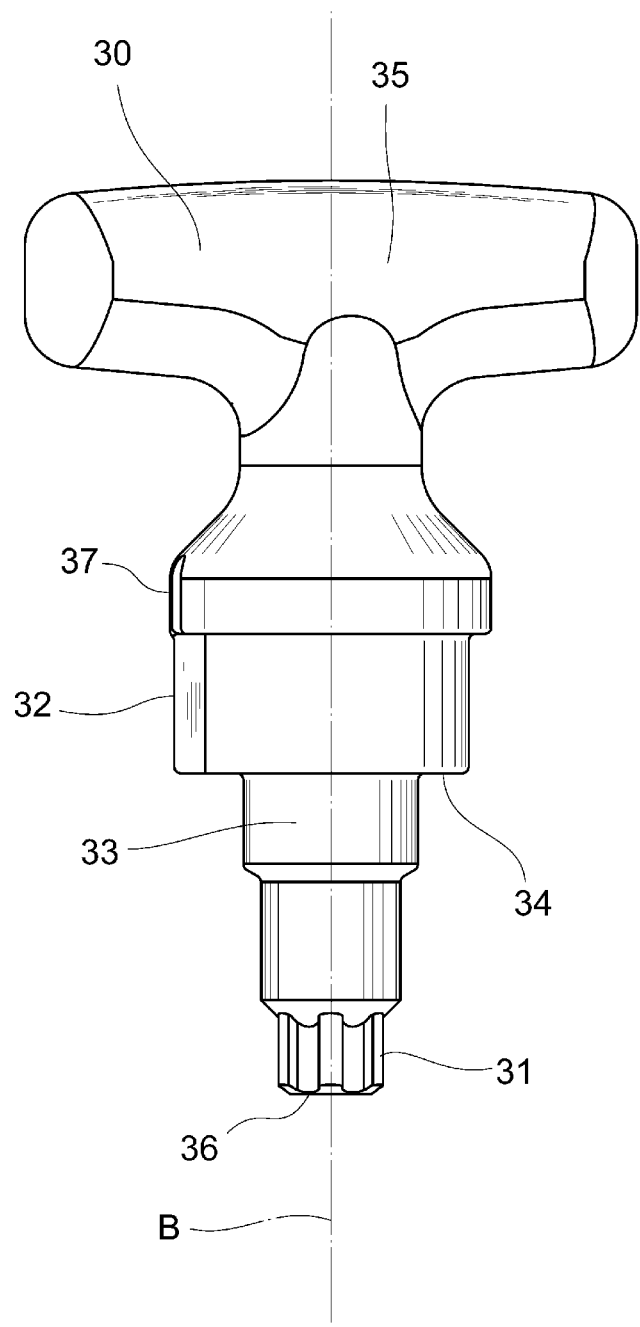
FIG. 4 is a plan view of the tool of FIG. 1.

As shown in FIGS. 2 to 4, the tool 30 in this embodiment has the rotational axis B extending from a leading end 36 side of the tool 30 to a base end side thereof. The tool 30 comprises a force transmitting portion (torque transmitting portion) 31 formed on the leading end 36 side and a gripping part 35 formed on the base end side. The force transmitting portion 31 in this embodiment will hereinafter be referred to as a torque transmitting portion. The tool 30 is a tool which is rotated around the rotational axis B by the gripping part 35 being gripped by hand and which is thereby capable of operating to fasten or loosen each fixing member, such as the fastening screw 40, with which the torque transmitting portion 31 is engaged. Such tool 30 is referred to as a driver or a wrench. A driver is also referred to as a screwdriver, which is a tool for turning screws. The wrench is a tool for turning bolts, nuts, etc. In other words, such driver or wrench is widely used as a tool for turning screw members. The tool 30 in this embodiment will hereinafter be referred to as a driver.

The cam portion 32, a cylindrical column portion 33 and a contact end surface 34 are formed between the torque transmitting portion 31 and the gripping part 35 of the driver 30 in this embodiment. The torque transmitting portion 31, the cylindrical column portion 33, the contact end surface 34, the cam portion 32 and the gripping part 35 are arranged in order from the leading end 36 side of the driver 30 to the base end side thereof. One driver 30 is provided with one cam portion 32, one cylindrical column portion 33 and one contact end surface 34. The cam portion 32 has an outer peripheral surface for which a dimension from the rotational axis B gradually varies in accordance with the angle at which the cam portion 32 is rotated around the rotational axis B. Therefore, the outer peripheral surface of the cam portion 32 is formed such that a minimum diameter portion thereof, which is closest to the rotational axis B, and a maximum diameter part thereof, which is most distant from the rotational axis B, are connected in a stepped manner and also such that the other area thereof constitutes a curved surface whose diameter smoothly varies from the minimum diameter part toward the maximum diameter part. The cylindrical column portion 33 has a dimension which is substantially constant from the outer peripheral surface to the rotational axis B regardless of the rotation around the central axis B. The contact end surface 34 of the driver 30 is formed as an end surface which is connected to the cam portion 32 and which faces toward the leading end 36 side, and such contact end surface 34 connects the cam portion 32 and the cylindrical column portion 33. The contact end surface 34 is part of a flat surface perpendicular to the rotational axis B, and is formed, as part of a surface which is rotationally symmetrical about the rotational axis B, so as to surround the rotational axis B. The shape of an outer peripheral edge of the contact end surface 34 corresponds to the shape of the cam portion 32.

The cutting tool 1, that is, the cutting inserts 10 and the tool body 20, are configured such that this driver 30 is used to perform the mounting of each cutting insert 10 and the positional adjustment of the cutting edge 11.

As shown in FIG. 1, the tool body 20 of the cutting tool 1 has a substantially cylindrical contour shape. The tool body 20 has the rotational axis A which extends from a leading end side thereof to the base end side thereof, and comprises a substantially circular leading end surface and a substantially cylindrical outer peripheral surface. The tool body 20 is provided with a plurality of the insert mounting parts 21. More specifically, the tool body 20 is provided with the insert mounting parts 21 at 18 locations. Each insert mounting part 21 is formed so as to be opened toward the leading end surface and toward the outer peripheral surface.

In this embodiment, the cutting inserts 10, the number of which is 18, corresponding to the number of the insert mounting parts 21, are mounted on the single tool body 20. When each cutting insert 10 is mounted on the tool body 20, the cutting edge 11 is projected from the tool body 20 toward the leading end side and toward an outer periphery side thereof. The cutting inserts 10 used in this embodiment have the same shape. As shown in FIGS. 7 to 11, in each cutting insert 10, an ultrahigh-pressure sintered body, serving as a cutting edge member, is secured to a cemented carbide base member, and such cutting edge member is provided with only one cutting edge 11. A material used for the ultrahigh-pressure sintered body is diamond, and brazing is employed to secure the cutting edge member to the base member. However, this does not limit the material for cutting inserts, and cutting inserts can be made from various materials. The number of cutting edges in one cutting insert is not limited to one and may be more than one. Further, cutting inserts may be configured as double-side use cutting inserts.

The cutting insert 10 is of a substantially hexahedron shape. The cutting insert 10 comprises two opposing end surfaces and a peripheral side surface extending between these end surfaces. The peripheral side surface comprises, in general, four side surface parts. For the purposes of description, one of the two opposing end surfaces is referred to as an upper surface, and the other end surface is referred to as a lower surface. An intersecting edge between the upper surface and the peripheral side surface is provided with the cutting edge 11. This cutting edge 11 comprises a corner cutting edge located at a corner of the upper surface and also comprises cutting edge portions extending on both sides of the corner cutting edge.

The upper surface of the cutting insert 10 comprises a rake surface part which extends inside of the cutting edge 11 and an inclined part 12 which is provided separately from the rake surface part. The inclined part 12 is arranged such that, when the cutting insert 10 is mounted on the tool body 20, the inclined part 12 is positioned behind the rake surface part, and is also positioned behind the rake surface part in a direction which enables the positional adjustment of the cutting edge 11. Further, as apparent from the description which will be made below, the inclined part 12 has a width to some extent in the direction which enables the positional adjustment of the cutting edge 11, in order to allow for the movement or position variation of the cutting insert which derives from the positional adjustment of the cutting edge 11. This width is set in accordance with the range of adjustment by the cam portion 32 of the driver 30. Further, this width is set so as to match either the size or the shape of an elastic wall portion 25 described below. Therefore, the inclined part 12 has a constant cross-sectional shape which is orthogonal to the direction which enables the positional adjustment of the cutting edge 11. More specifically, the inclined part 12 is formed as an inclined flat surface. In other words, the inclined part 12 is inclined so as to vary the cutting insert 10 in its thickness and also extends in a direction perpendicular to a direction of variation of the thickness (being a dimension between the upper surface and the lower surface). Meanwhile, the lower surface of the cutting insert 10 is entirely formed as a flat surface. The inclined part 12 of the upper surface and the lower surface serve as contact surfaces when the cutting insert 10 is mounted on the tool body 20. In particular, the inclined part 12 is configured as a contact surface which comes into contact with the elastic wall portion 25, which will be described below, of the tool body 20, and such inclined part 12 has a shape corresponding to the elastic wall portion 25.

As described above, the tool body 20 comprises the insert mounting parts 21 which are equal in number to the cutting inserts 10, i.e., the insert mounting parts 21 at the 18 locations. The cutting inserts 10 in this embodiment have the same shape, and thus, the insert mounting parts 21 are formed so as to have the same shape. Only the insert mounting part 21 at one of the locations will be described below, and since such description also applies to the other insert mounting parts 21 at the other 17 locations, the description thereof will be omitted here.

Figure 5:
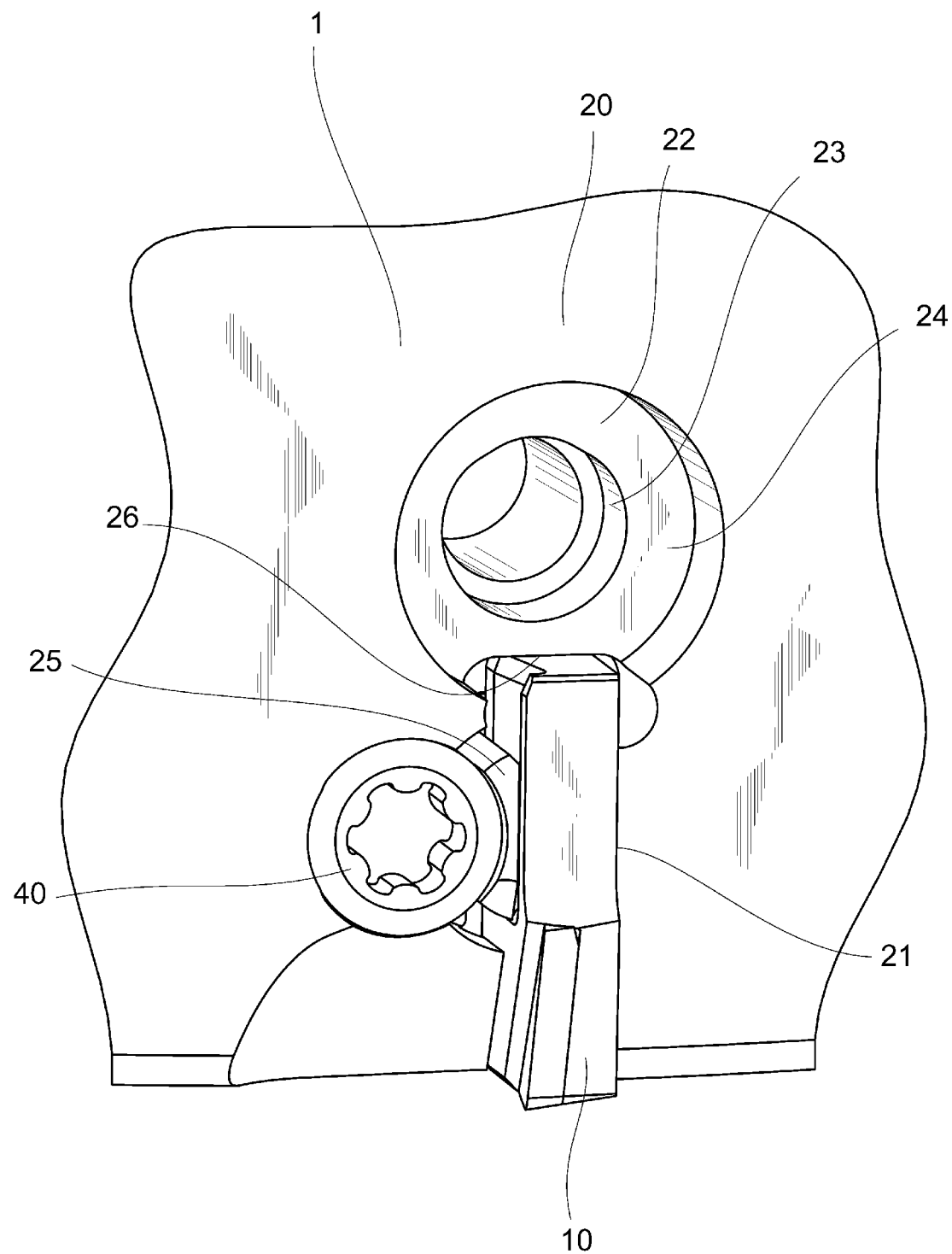
FIG. 5 is a partially enlarged perspective view of the cutting tool of FIG. 1.
Figure 6:
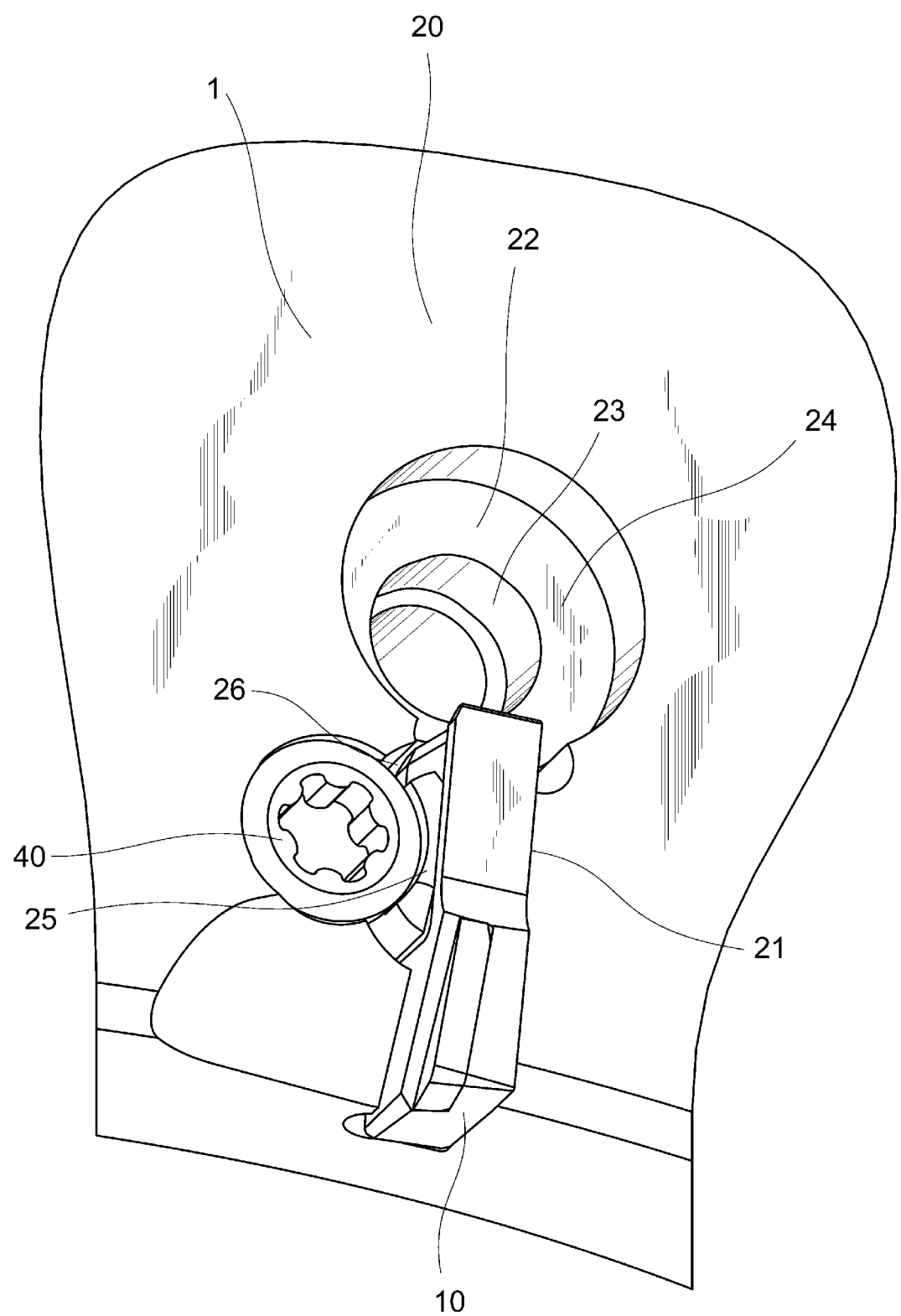
FIG. 6 is a partially enlarged perspective view of the cutting tool of FIG. 1, as seen from another direction.
Figure 7:
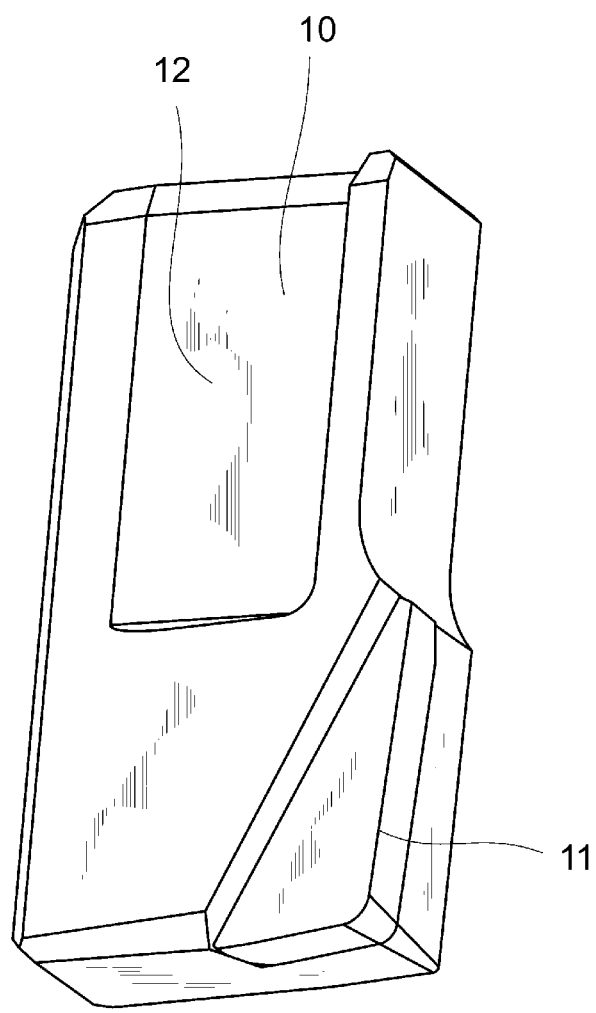
FIG. 7 is a perspective view of a cutting insert which is used in the cutting tool of FIG. 1.
Figure 8:
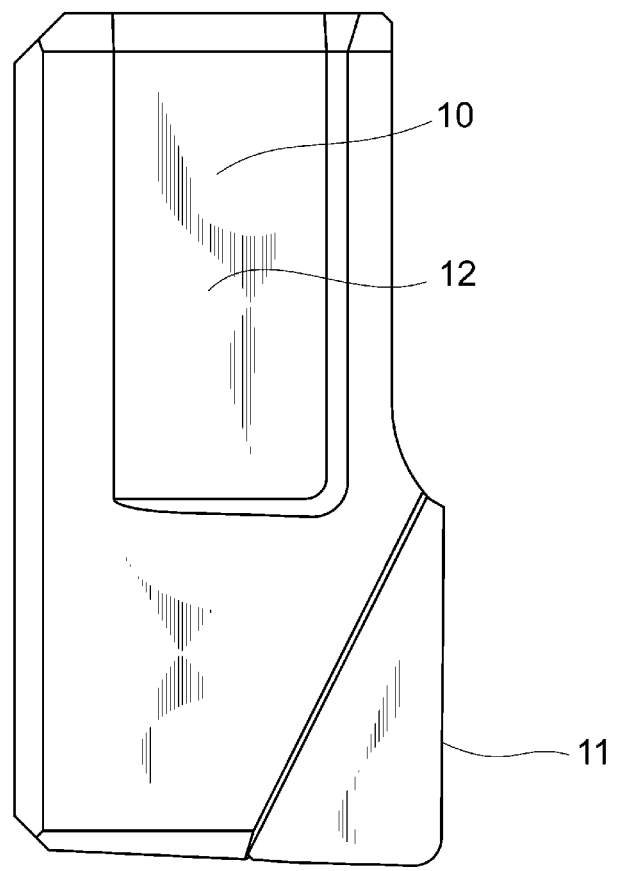
FIG. 8 is a plan view of the cutting insert of FIG. 7.
Figure 9:
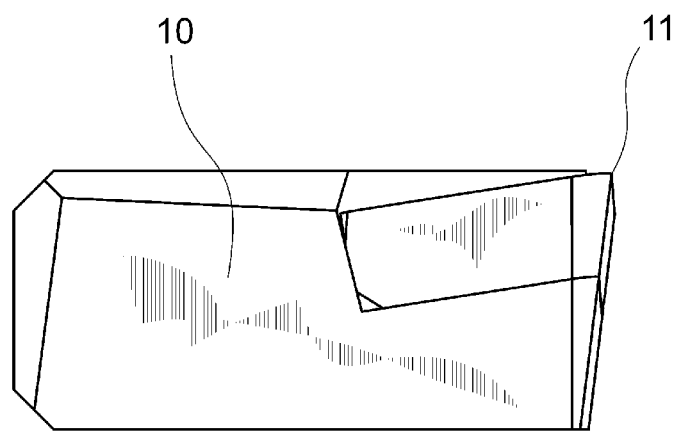
FIG. 9 is a front view of the cutting insert of FIG. 7.
Figure 10:
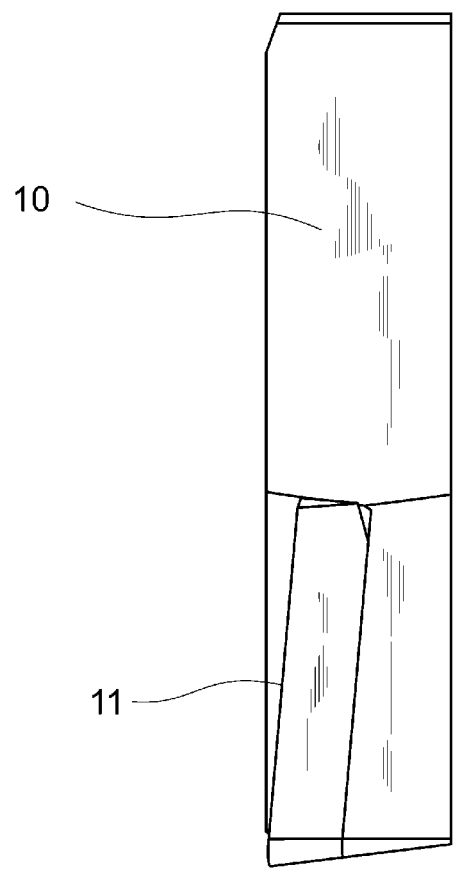
FIG. 10 is a right side view of the cutting insert of FIG. 7.
Figure 11:
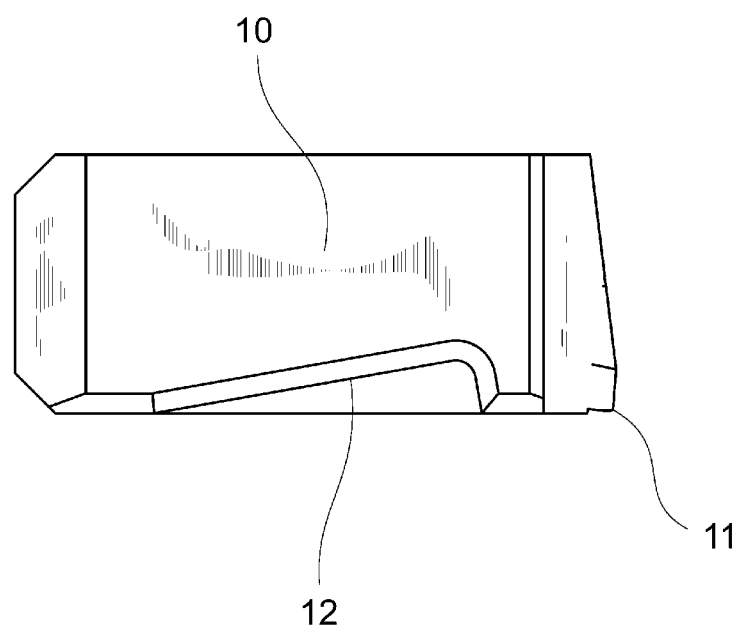
FIG. 11 is a back view of the cutting insert of FIG. 7.
Figure 20:
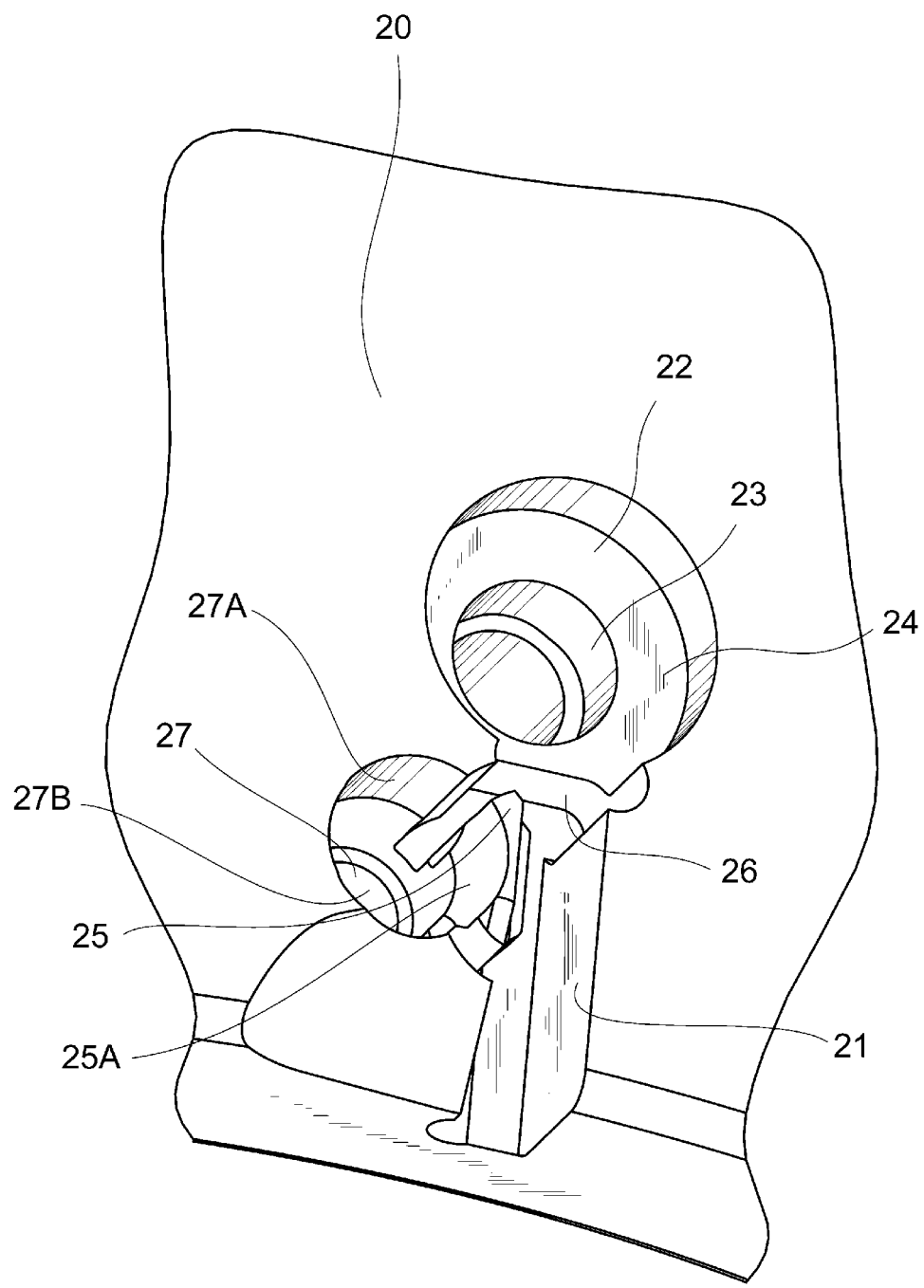
FIG. 20 is a partially enlarged perspective view in a state in which a cutting insert and a fastening screw have been detached from the cutting tool of FIG. 1.

As shown in the partially enlarged perspective views of FIGS. 5, 6 and 20, each insert mounting part 21 comprises a recess corresponding to the shape of each cutting insert 10. The recess is, in general, formed by a bottom surface which faces in a tool rotating direction, two side wall surfaces which extend so as to intersect with the bottom surface, in particular, so as to be substantially perpendicular to the bottom surface, and the elastic wall portion 25, which is provided so as to oppose the bottom surface. The elastic wall portion 25 is a relatively thin wall portion and is configured such that a basal part thereof is prone to be elastically deformed when an appropriate pressing force is applied thereto. In particular, herein, the elastic wall portion 25 is formed such that, as described below, it receives a force from the fastening screw 40 and is thereby elastically inclined toward the cutting insert 10 on the insert mounting part 21. Therefore, the elastic wall portion 25 comprises the basal part and a part-to-be-pressed which is located closer to a free end side than the basal part and which is thicker than the basal part. The part-to-be-pressed of the elastic wall portion 25 has a first contact inclined surface 25A facing toward the bottom surface and a second contact inclined surface 25B facing outward of the recess. It should be noted that the first contact inclined surface 25A is configured so as to be capable of pressing and thereby firmly holding the cutting insert 10, and the second contact inclined surface 25B is configured so as to be capable of being pressed by the fastening screw 40 such that the pressing force is imparted to the elastic wall portion 25. As described below, the first contact inclined surface 25A comes into contact with the inclined part 12 of the cutting insert 10, and the second contact inclined surface 25B comes into contact with a wedge part 43 of the fastening screw 40.

Figure 12:
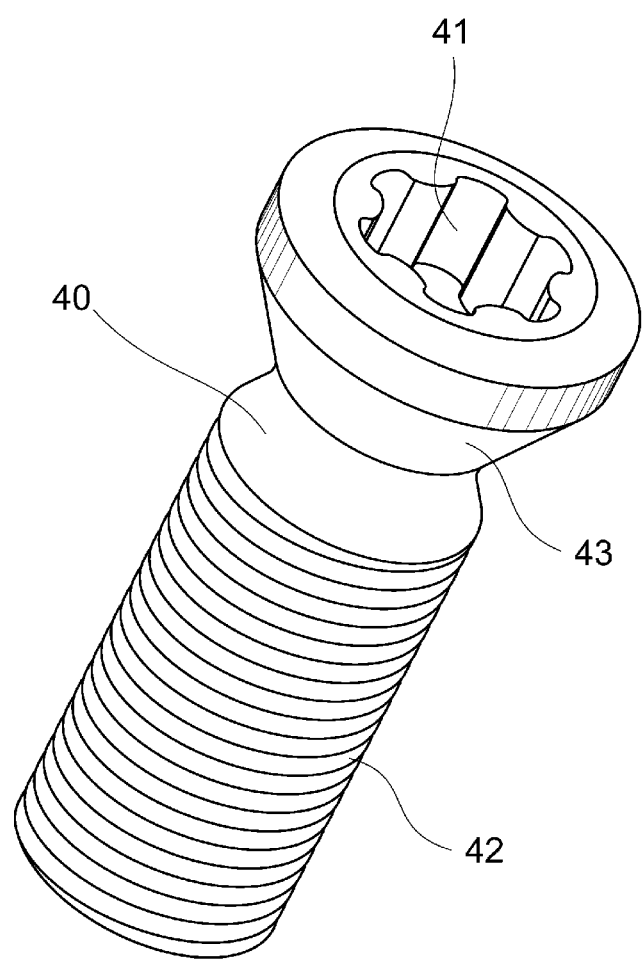
FIG. 12 is a perspective view of a fastening screw in an embodiment of the present invention.
Figure 13:
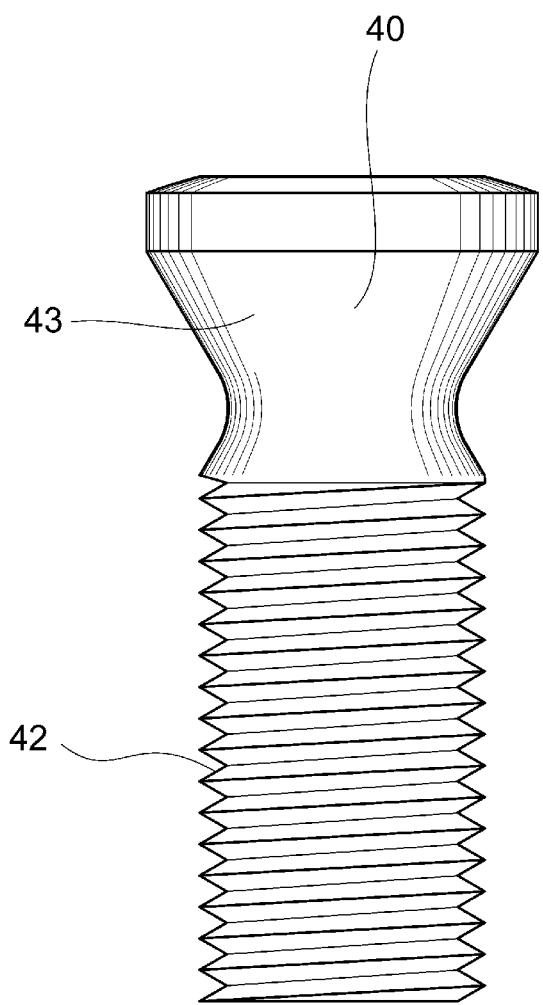
FIG. 13 is a side view of the fastening screw of FIG. 12.
Figure 14:
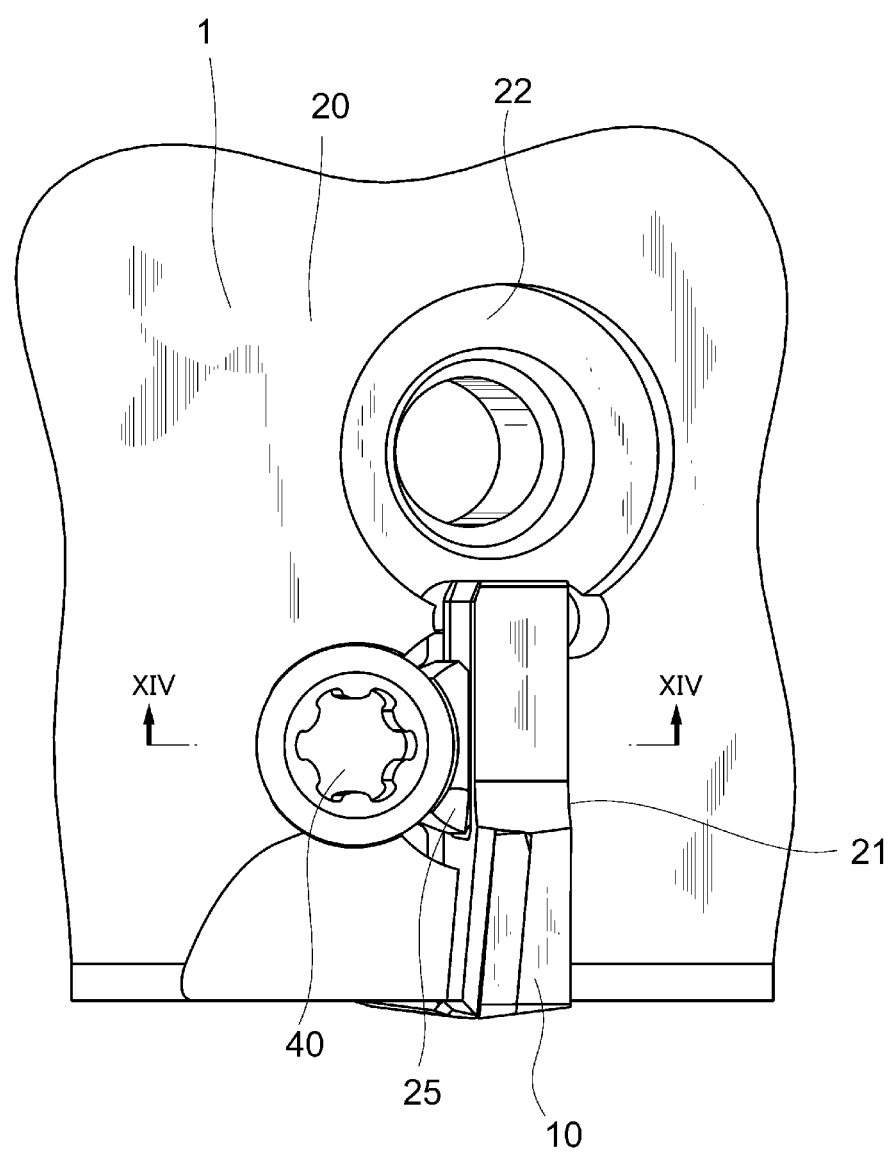
FIG. 14 is a partially enlarged side view of the cutting tool of FIG. 1.
Figure 15:
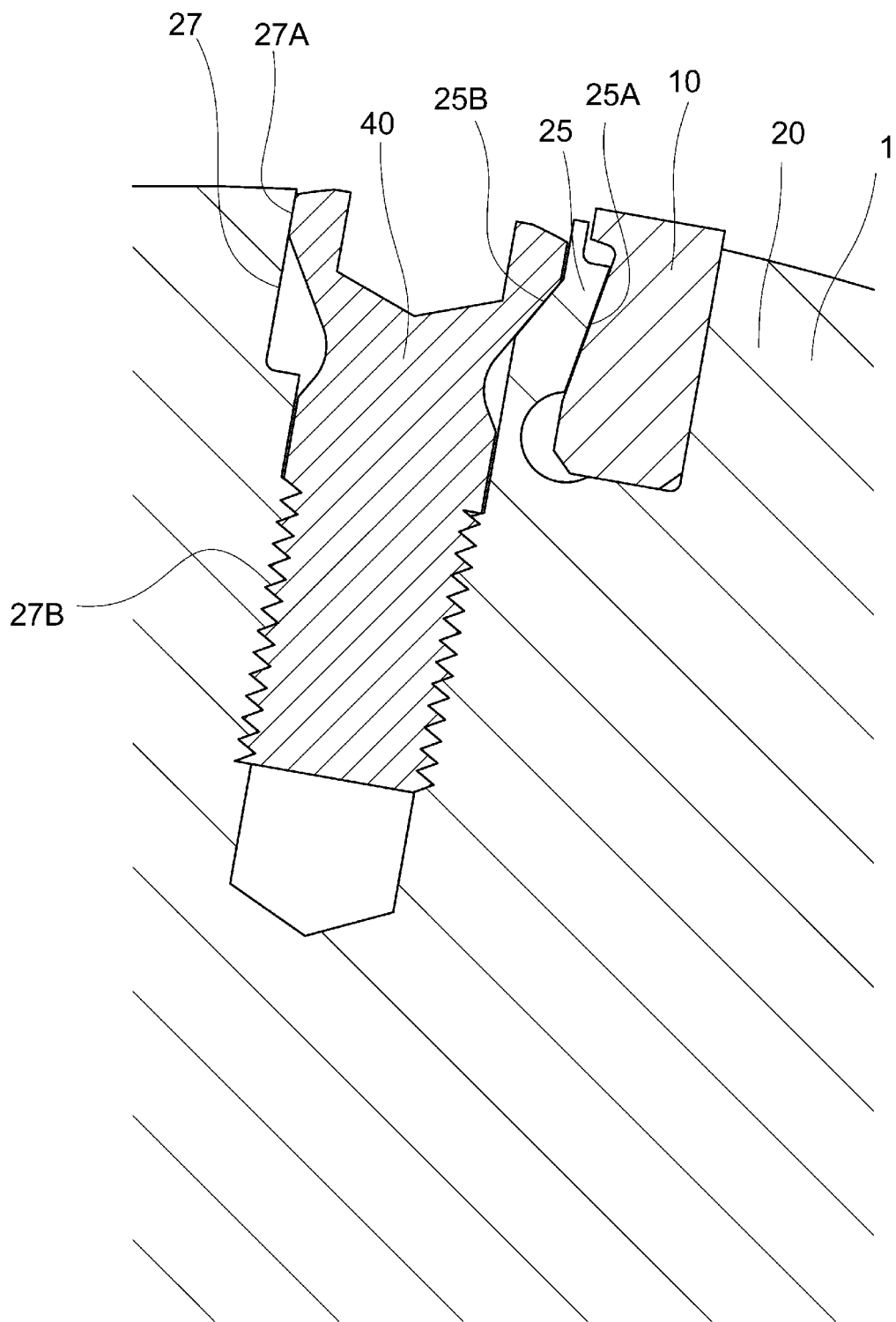
FIG. 15 is a cross-sectional view taken along a XIV-XIV line of FIG. 14.

One threaded hole 27 is formed for each insert mounting part 21, so as to be adjacent to the elastic wall portion 25, in particular, so as to be located in the vicinity of the second contact inclined surface 25B. The fastening screw 40 is screwed into a screw part 27B of the threaded hole 27. A part around an opening of the threaded hole 27 has an enlarged diameter part 27A which has an enlarged diameter which allows a head part of the fastening screw 40 to be received therein. As shown in FIGS. 12 and 13, the fastening screw 40 has a screw part 42 which forms a spiral male screw to be screwed into the screw part 27B of the threaded hole 27, and the fastening screw 40 also has a wedge part (tapered part) 43 having a wedge shape in a side view. As shown in FIG. 15, the first contact inclined surface 25A is configured so as to come into contact with the inclined part 12 of the cutting insert 10, whereas the second contact inclined surface 25B is configured so as to come into contact with the wedge part 43 of the fastening screw 40. When the screw part 42 of the fastening screw 40 is engaged with, i.e., screwed into, the screw part 27B of the threaded hole 27, the wedge part 43 of the fastening screw 40 comes into contact with the second contact inclined surface 25B of the elastic wall portion 25, and the head part of the fastening screw 40 comes into contact with the enlarged diameter part 27A of the threaded hole 27. Thus, when the fastening screw 40 is fastened, it presses the elastic wall portion 25 from the screw hole 27 side, whereby the elastic wall portion 25 is elastically deformed toward the cutting insert 10. Therefore, when the fastening screw 40 is fastened, the elastic deformation of the elastic wall portion 25 partially narrows the gap between the first contact inclined surface 25A of the insert mounting part 21 and the bottom surface thereof, whereby the cutting insert 10 is fixed. In other words, the elastic wall portion 25 comes into contact with, and thereby presses, the inclined part 12 of the cutting insert 10 while the opposite-side end surface of the cutting insert 10 comes into contact with the bottom surface of the recess of the insert mounting part 21, and thus, the cutting insert 10 is sandwiched and, in turn, fixed.

As shown in FIGS. 1, 5, 6 and 20, the tool body 20 further comprises, in the outer peripheral part thereof, the engagement part (guide recessed part) 22. The engagement part 22 will hereinafter be referred to as a guide recessed part. The guide recessed part 22 is arranged on the base end side of the tool body 20 with respect to the insert mounting part 21. To be more precise, in the direction which enables the positional adjustment of the cutting edge 11, the guide recessed part 22 is located at a position opposite to the cutting edge 11 whose position is adjusted with respect to the insert mounting part 21. The guide recessed part 22 is formed with a size and depth which receive the torque transmitting portion 31, the cam portion 32, the cylindrical column portion 33 and the contact end surface 34 of the driver 30. The guide recessed part 22 comprises a second contact end surface 24 which comes into contact with the contact end surface 34 of the driver 30. The guide recessed part 22 also comprises a curved inner wall portion 23 in which the cylindrical column portion 33 of the driver 30 is rotatably received around the rotational axis B. The cutting insert 10 is arranged such that part thereof can be projected inward of the guide recessed part 22. In other words, the guide recessed part 22 and the insert mounting part 21 are partially connected to each other due to one side wall surface, of the insert mounting part 21, being located at a boundary therebetween, which is formed to be at a low level (due to such side wall surface being formed such that most of such side wall surface is removed).

Next, the operation and effects of the tool and the cutting tool of the present embodiment will be described. In particular, a method of mounting (i.e., a method of fixing) a cutting insert with the use of the above-described driver and a method of adjusting the position of a cutting edge will be described.

The cutting insert 10 is inserted into the recess of the insert mounting part 21. This insertion is performed in a state in which the fastening screw 40 has been loosened or detached. By inserting the cutting insert 10 into the recess from the leading end side or outer peripheral surface side of the tool body 20, the lower surface of the cutting insert 10 can come into contact with the bottom surface of the recess, and the peripheral side surface of the cutting insert 10 can come into contact with the two side wall surfaces of the recess. At this time, the inclined part 12 of the cutting insert 10 opposes or comes into contact with the first contact inclined surface 25A of the elastic wall portion 25. In this state, by firmly screwing the fastening screw 40 into the threaded hole 27, the elastic wall portion 25 is elastically deformed toward the cutting insert 10, whereby the cutting insert 10 can be fixed in the recess.

The inclined part 12 is inclined such that the cutting insert 10 becomes thinner at a part thereof closer to the side surfaces which are provided with the cutting edge 11 which is arranged on the outer periphery side of the tool body 20. In other words, when the cutting insert 10 is arranged on the insert mounting part 21, the inclined part 12 is formed such that part thereof which is closer to the outer periphery of the tool body 20 involves a larger amount of recess, in the upper surface, which derives from such inclined part. More specifically, in FIGS. 8 and 11, the inclined part 12 is inclined such that the cutting insert 10 becomes thinner at a part thereof which is closer to the right-side surface. Therefore, the elastic wall portion 25 is engaged with the inclined part 12 due to the elastic deformation of the elastic wall portion 25, whereby the inclined part 12 receives a force in a direction in which the inclined part 12 is pressed, by the first contact inclined surface 25A, toward a deep side of the recess. Accordingly, when the cutting tool 1 is rotated at high speed, the cutting insert 10 can be prevented from flying toward the outer periphery due to centrifugal force. In short, when the cutting insert 10 is mounted on the cutting tool 1, the inclined part 12 is inclined in a direction receiving centrifugal force. Thus, the contact between the inclined part 12 and the first contact inclined surface 25A prevents the cutting insert 10 from being shifted and also prevents the cutting insert 10 from flying due to centrifugal force deriving from the high-speed rotation of the cutting tool 1. Accordingly, the cutting tool 1 of this embodiment involves extremely enhanced safety in increasing the cutting speed.

It should be noted that the driver 30 can be used when fastening or loosening the fastening screw 40. The head part of the fastening screw 40 comprises a torque receiving portion 41 which is engaged with the torque transmitting portion 31 of the driver 30. As shown in FIGS. 2 and 12, the shape of engagement (cross-sectional shape) between the torque transmitting portion 31 and the torque receiving portion 41 in this embodiment is a hexagonal star shape. Examples of such hexagonal star shape include shapes called Torx (registered trademark) and Torx Plus (registered trademark). The shape of engagement between the torque transmitting portion 31 and the torque receiving portion 41 in this embodiment is a shape called Torx Plus (registered trademark).

Meanwhile, the cutting tool 1 in this embodiment can adjust the position of the cutting edge 11 of the cutting insert 10 by means of the cam portion 32 of the driver 30. The cutting tool 1 can adjust the position of each cutting edge 11 with respect to a direction of the rotational axis A. In other words, the cutting insert 10 can adjust a fixation position in a direction in which the rotational axis A extends. However, the direction of the positional adjustment of the cutting edge 11 of the cutting insert 10 is not limited to the direction in which the rotational axis A extends, and is only required to be any direction at an angle other than 90° relative to the rotational axis A in a side view of the cutting tool 1. It should be easily appreciated that, if the direction which enables the adjustment of the cutting insert 10 is a direction at an angle of 90° relative to the rotational axis A, the position of the cutting edge 11 cannot be adjusted even when the cutting insert 10 is moved. If an angle other than 90° is employed in a side view of the cutting tool 1, the position of the cutting edge 11 can be adjusted in the direction of the rotational axis A by adjusting the position of the cutting insert 10. It should be noted that this angle is preferably an acute angle. It is more preferable that the cutting insert 10 can be adjusted in a direction which is generally along the direction in which the rotational axis A extends.

The cutting insert 10 in the present embodiment has a substantially hexagonal shape, and the end surface thereof which is provided with the rake surface is provided with the inclined part 12, as described above. The inclined part 12 is formed as an inclined flat surface. In other words, the inclined part 12 is inclined so as to involve variations in the thickness of the cutting insert 10 and also extends in a direction perpendicular to a direction of variations in the thickness. The lower surface of the cutting insert 10 is formed as a flat surface. The inclined part 12 of the upper surface and the lower surface serve as contact surfaces when the cutting insert 10 is mounted on the tool body 20. The inclined part 12 comes into contact with the elastic wall portion 25, and the lower surface comes into contact with part (seating surface) of the recess of the insert mounting part 21. The above-described direction in which the inclined part 12 extends is a direction parallel to the lower surface. Thus, when the fastening screw 40 has been loosened, the cutting insert 10 is capable of moving parallel to the direction in which the inclined part 12 extends, i.e., the direction which enables the positional adjustment of the cutting edge. In other words, since the position of the cutting insert 10 can be adjusted, the position of the cutting edge 11 can be adjusted. However, the inclined part 12 is only required to extend in a desired range. Further, it is unnecessary for the inclined part 12 to extend strictly in the direction parallel to the lower surface, and it is only required for at least one of the contact surfaces of the cutting insert 10 which come into contact with the insert mounting part of the tool body 20 to extend in a desired range. Such desired range refers to a range required for the positional adjustment of the cutting edge 11. In other words, the desired range refers to a dimensional range longer than the range of positional adjustment of the cutting edge 11. The contact surfaces on the insert mounting part 21 side may each have any shape, as long as they can come into contact with the respective contact surfaces on the cutting insert 10 side. However, at least one of the contact surfaces on the insert mounting part 21 side preferably extends, in a side view of the cutting tool 1, at an angle other than 90° relative to the rotational axis A. It should be noted that the part of the recess of the insert mounting part 21 is preferably a flat surface which extends in this manner. When the part of the recess of the insert mounting part 21 is formed as a flat surface, such flat surface comes into contact, via a wide range, with the flat surface constituting the lower surface of the cutting insert 10 while the position of the cutting insert 10 can be easily adjusted.

Figure 17:
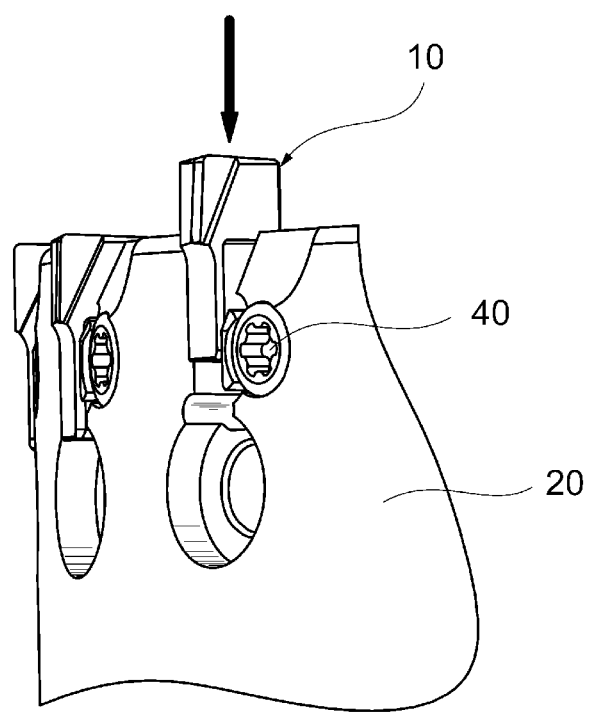
FIG. 17 is an explanatory view when a cutting insert is mounted on a cutting tool.

Herein, a procedure for adjusting the position of the cutting edge 11 will be described. Firstly, as shown in FIG. 17, the tool body 20 is removed from a machine tool and is placed such that the insert mounting part 21 is opened so as to face upward. In order to adjust the position of the cutting edge 11 while confirming such position, a measuring apparatus such as a tool pre-setter may be used. With the fastening screw 40 being loosened, the cutting insert 10 is pushed into the insert mounting part from the leading end side of the tool body 20 toward the base end side thereof (in the direction of an arrow in FIG. 17). At this time, if an abutment part (part of a side wall surface) 26, as shown in FIGS. 5 and 6, is provided, when the cutting insert 10 is pushed as far as it will abut against the abutment part 26, a constant depth of such pushing can be achieved easily.

Figure 16:
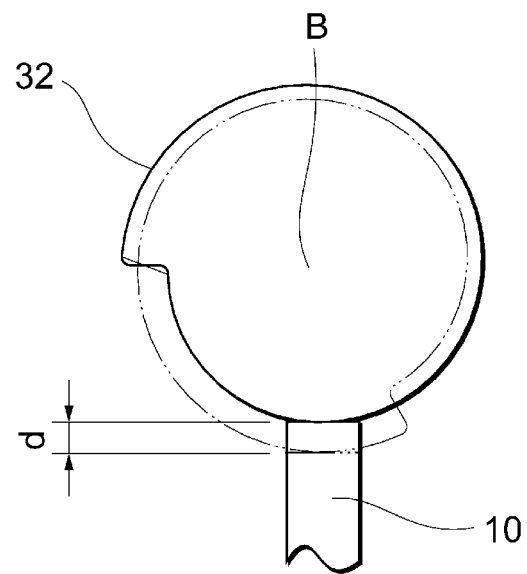
FIG. 16 is an explanatory view showing the relationship between a cutting insert and a cam portion.
Figure 18:
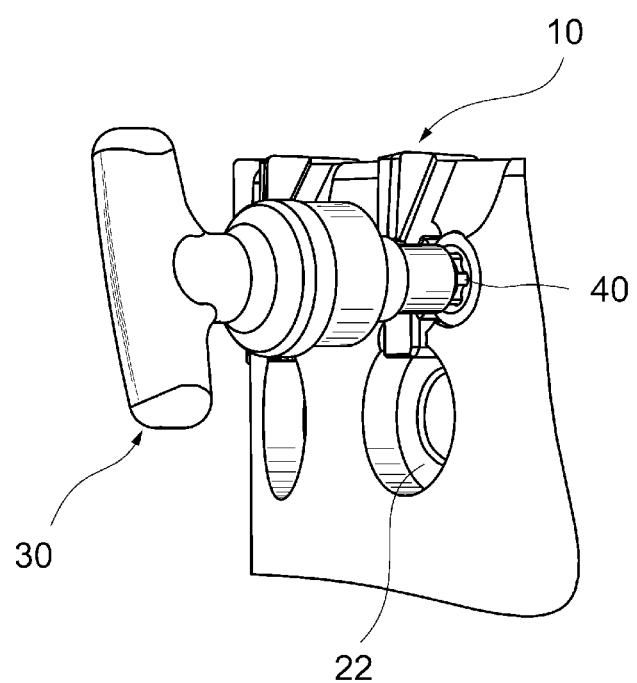
FIG. 18 is an explanatory view when a fastening screw is fastened with a tool.
Figure 19:
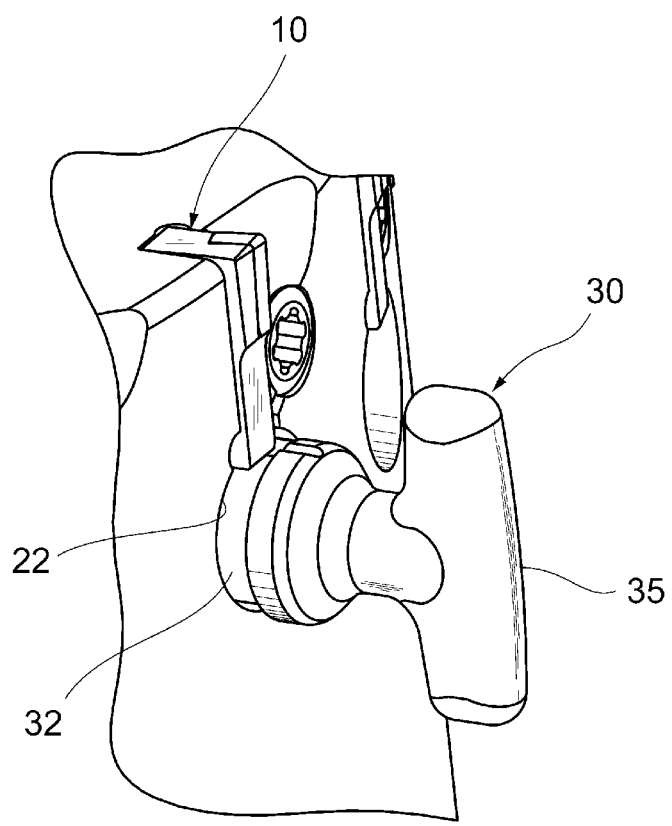
FIG. 19 is an explanatory view when a cam portion of a tool is brought into contact with a cutting insert.

Next, as shown in FIG. 18, the torque transmitting portion 31 of the driver 30 is engaged with the torque receiving portion 41 of the fastening screw 40, and the driver 30 is then turned, resulting in a state in which the cutting insert 10 is loosely fastened (a temporarily retained state). At this time, the cutting insert 10 is fastened so as to be moved by only being pressed by the cam portion 32 and also not to fall from the position of the cutting insert 1 after such move, as described above. In this state, as shown in FIG. 19 (seen from a direction different from those of FIGS. 17 and 18), the leading end 36 side of the driver 30 is inserted into the guide recessed part 22, and the driver 30 is then rotated clockwise as viewed from the gripping part side, so that the cutting insert 10 is gradually pressed by the cam portion 32, whereby the position of the cutting edge 11 can be adjusted (in a direction opposite to the direction of the arrow in FIG. 17). FIG. 16 is an explanatory view of the relationship between the cutting insert 10 and the cam portion 32. By inserting the driver 30 in a direction in which the portion of the cam portion 32 which is close to the rotational axis B (portion thereof which is close to the minimum diameter part) is located on the cutting insert 10 side, i.e., in a direction of the solid line of FIG. 16 and then by rotating the driver 30 clockwise, the cutting insert 10 and the cam portion 32 come into contact with each other. By further rotating the driver 30, the cutting insert 10 can be pushed and moved, as indicated by a dimension d (the position indicated by the chain double-dashed line) in FIG. 16. The dimension d can be adjusted to an arbitrary dimension, in accordance with the rotation angle at which the cam portion 32 is rotated. After the positional adjustment of the cutting edge 11, the fastening screw 40 is fastened using the driver 30 until it is completely fixed, whereby the cutting insert 10 is firmly fixed. In such state, the position of the cutting edge 11 is measured, and if such measured position falls within an allowable adjustment range, such adjustment is ended. If the position of the cutting edge 11 falls outside the allowable adjustment range, the fastening screw 40 is loosened, and adjustment is performed again. It should be noted that, due to the single driver 30 comprising both the torque transmitting portion 31 and the cam portion 32, an operator can effectively carry out, with only the single driver 30, both the positional adjustment of the cutting edge 11 of the cutting insert 10 and the work of fixing or loosening the cutting insert 10 in a short time, without the need to replace the driver 30 with another tool.

The shape of the cam portion 32 in this embodiment is a shape in which the rotation angle and the distance from the rotational axis B vary in a proportional manner. With such shape, the adjustment position is proportional to the angle at which the driver 30 is rotated, resulting in easier understanding of such adjustment position through intuition, and this allows fine adjustment to be more easily performed. However, the shape of the cam portion 32 is not limited to such shape and may be any shape, as long as the distance from the rotational axis B varies with respect to the rotating direction. For example, it may be possible to employ a shape in which, during the early stage of rotation before the cutting insert 10 and the cam portion 32 come into contact with each other, the distance from the rotational axis B greatly varies such that the above contact is reached early and also in which, after such contact, the distance from the rotational axis B varies slightly such that fine adjustment is performed easily. The driver 30 in this embodiment has a notch-shaped mark 37 on an outer surface between the cam portion 32 and the gripping part 35. This mark 37 is located at the part indicating the shortest distance of the cam portion from the rotational axis B. Therefore, when being inserting into the guide recessed part 22, the driver 30 may be inserted therein with the notch-shaped mark 37 facing toward the cutting insert 10. When the notch-shaped mark 37 faces toward the cutting insert 10, the cutting insert 10 does not collide with the cam portion 32, and thus, the driver 30 can be smoothly inserted into the guide recessed part 22.

In order for the cam portion 32 to press the cutting insert 10 such that the position of the cutting edge 11 is adjusted, the guide recessed part 22 is formed so as to be adjacent to one side of the cutting insert 10 with respect to the adjustment direction of the cutting edge 11. In other words, the guide recessed part 22 is arranged in a direction in which the cutting insert 10 can be pressed for adjustment. In the case of the cutting tool 1 of this embodiment, the guide recessed part 22 is formed so as to be adjacent, on the base end side, to the cutting insert 10. Further, the arrangement is employed, as to the adjustment range of the position of the cutting edge 11, in which part (contact part) of the cutting insert 10 is projected inward of the guide recessed part 22, i.e., in which, as described above, the cutting insert 10 can come into contact with the cam portion 32 of the driver 30.

Further, the driver 30 is provided with the cylindrical column portion 33 and the guide recessed part 22 is provided with the curved inner wall portion 23, and the cylindrical column portion 33 and the curved inner wall portion 23 are configured so as to come into contact with each other. With the cylindrical column portion 33 and the curved inner wall portion 23 coming into contact with each other, when rotating the driver 30, the position of the rotational axis B is uniquely defined, and this facilitates the rotation of the driver 30 around the rotational axis B. If the driver 30 can easily be rotated around the rotational axis B, the shape of the cam portion 32 works effectively, resulting in easy positional adjustment of the cutting edge 11. The cam portion 32 of the driver 30 receives reaction force when pressing the cutting insert 10. When the cylindrical column portion 33 is in contact with the curved inner wall portion 23, even if the cam portion 32 receives this reaction force, the rotational axis B of the driver 30 is not moved (is not shifted), and thus, the cutting insert 10 can be pushed and moved efficiently. The cylindrical column portion 33 has a shape of rotational symmetry about the rotational axis B of the driver 30. The corresponding curved inner wall portion 23 is a cylindrically-shaped curved surface, i.e., a recess having a circular cross-sectional shape. However, the configuration is not limited thereto. The curved inner wall portion 23 may have any shape, as long as the driver 30 can be turned smoothly around the rotational axis B. The gap of the curved inner wall portion 23 with the cylindrical column portion 33 may be adjusted as appropriate. As to the curved inner wall portion 23, a curved surface portion thereof having a circular-arc-shaped cross-sectional shape may be provided only on the side opposite to the cutting insert 10, since the curved inner wall portion 23 is only required to support the driver 30 such that the rotational axis B is not moved while receiving reaction force generated when the cam portion 21 presses the cutting insert 10.

Further, the driver 30 is provided with the contact end surface 34 which faces toward the leading end 36 side, and the guide recessed part 22 is provided with the second contact end surface 24 which comes into contact with the contact end surface 34. With the contact end surface 34 and the second contact end surface 24 coming into contact with each other, the depth when the driver 30 is inserted into the guide recessed part 22 is corrected to a desired insertion depth. Thus, such insertion is only required to be made until the contact end surface 34 comes into contact with the second contact end surface 24 without being conscious of the depth of insertion of the driver 30, and thus, the cutting insert 10 and the cam portion 32 can consistently come into contact with each other in a preferred state. It should be noted that, in this embodiment, the contact end surface 34 and the second contact end surface 24 are both flat surfaces, but such two surfaces are not limited thereto. The contact end surface 34 and the second contact end surface 24 may each have any shape, as long as they come into contact with each other and as long as they have shapes which do not prevent the driver 30 from being rotated. In other words, the contact end surface 34 and the second contact end surface 24 may each have any shape, as long as the contact end surface 34 is at least part of a shape of rotational symmetry about the rotational axis B of the driver 30 and as long as the second contact end surface 24 is a surface which is capable of coming into contact with the contact end surface 34. For example, the contact end surface 34 and the second contact end surface 24 may be respective parts of substantially conical surfaces (tapered surfaces) which come into contact with each other. The contact end surface 34 and the second contact end surface 24 are not limited to conical surfaces and may each have a shape of rotational symmetry like part of a spherical surface. If each of the contact end surface 34 and the second contact end surface 24 is part of a substantially conical surface or a spherical surface, this can achieve a configuration corresponding to both the cylindrical column portion 33 and the contact end surface 34, without providing the above-described cylindrical column portion 33. In other words, if each of the contact end surface 34 and the second contact end surface 24 is part of a substantially conical surface or a spherical surface, it is possible to correct the depth of insertion of the driver 30 and also possible to receive reaction force from the cutting insert 10. The cross-sectional shape of the second contact end surface 24 in a direction perpendicular to the rotational axis B is not limited to a perfect circular shape, and such cross-sectional shape may be comprised of only a portion corresponding to a circular arc serving as part of a circle.

In the cutting tool 1 of this embodiment, the adjustment structure for the position of the cutting edge 11 is formed on the driver 30 side. Therefore, the cutting tool 1 after the adjustment does not involve, in any way, the adjustment structure including members such as an adjustment component. Therefore, when this cutting tool 1 is rotated at high speed so as to be used for high-speed cutting, the dynamic balance is less likely to be lost. In other words, few members which cause a loss of the dynamic balance are arranged in the cutting tool 1. As a result, in the cutting tool 1 of this embodiment, the cutting speed can be increased compared with a conventional cutting tool, and the processing efficiency of the cutting tool 1 can therefore be significantly improved. Further, the simple structure makes it possible to reduce the weight of the cutting tool 1, leading to the cutting tool 1 being suitable for further increasing the cutting speed. As to the elastic wall portion 25 integrally formed with the tool body 20, the fixation structure of the cutting insert 10 is arranged with good balance, and thus, the dynamic balance is less likely to be lost. Further, the simple structure is advantageous in reducing the weight of the cutting tool 1. Moreover, a reduced total number of components results in the suppression of manufacturing costs. In particular, when the cutting tool 1 employs a large number of edges, the accompanied significant reduction in the total number of components results in a significant suppression of manufacturing costs.

In the cutting tool 1 of this embodiment, the cutting insert 10 is pressed directly by the cam portion 32 of the driver 30, but the configuration is not limited thereto. For example, although not shown in the figures, the configuration may be such that the cutting insert 10 is mounted in a cartridge, etc., and that the cartridge, etc., is pressed by the cam portion 32 of the driver 30, so that the position of the cutting edge 11 is adjusted indirectly. When using the cartridge, the guide recessed part is preferably arranged so as to be adjacent to a cartridge mounting part.

The adjustment direction of the cutting edge 11 of the cutting tool 1 of this embodiment is the direction of the rotational axis A of the cutting tool 1, but the adjustment direction is not limited thereto. For example, if the guide recessed part 22 is arranged on a radially inner side (relative to the rotational axis of the tool body) of the cutting insert 10, this is applicable also to the adjustment of the radial position of the cutting edge 11. The adjustment mechanism or system for the position of a cutting edge according to the present invention is also applicable when adjusting the two positions, i.e., the axial position and the radial position, such as when providing two guide recessed parts 22.

FIGS. 21 to 27 each show a tool 300 according to another embodiment of the present invention. In the description below, the members or portions having the same structures or functions as those of the tool 30 shown in FIGS. 2 to 4, etc., are denoted by the same symbols as those of FIGS. 2 to 4, and the description thereof will be omitted here.

Figure 21:
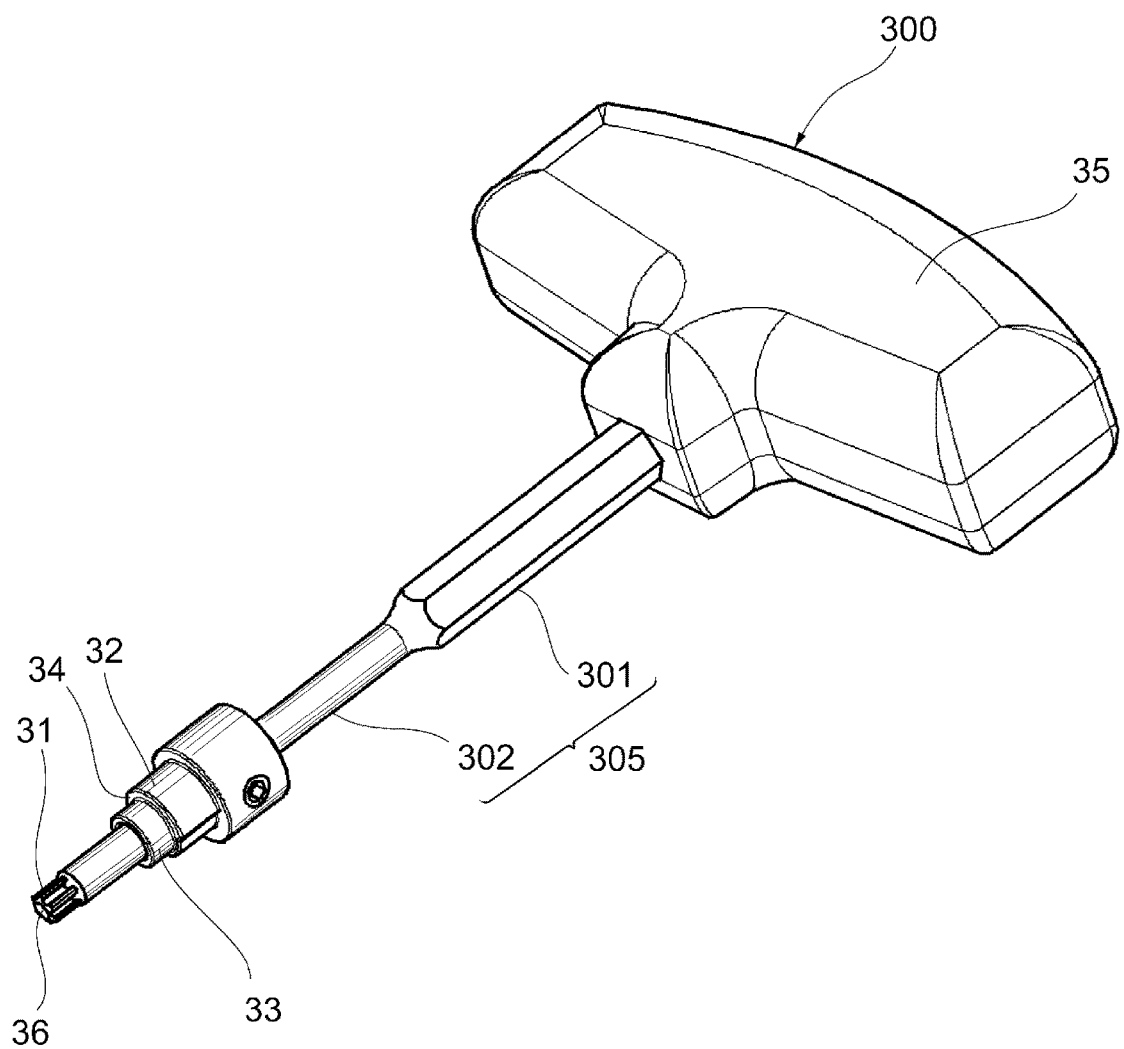
FIG. 21 is a perspective view of a tool in another embodiment of the present invention.
Figure 22:
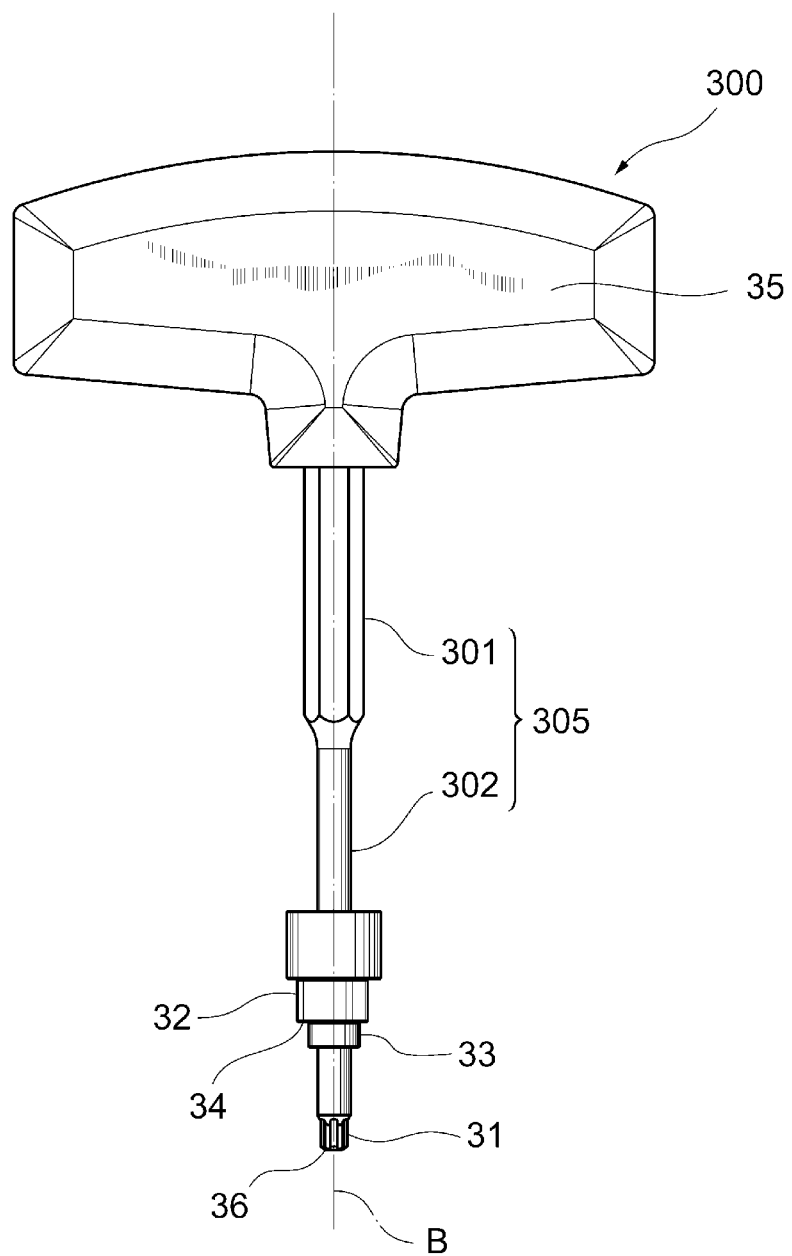
FIG. 22 is a plan view of the tool of FIG. 21.
Figure 23:
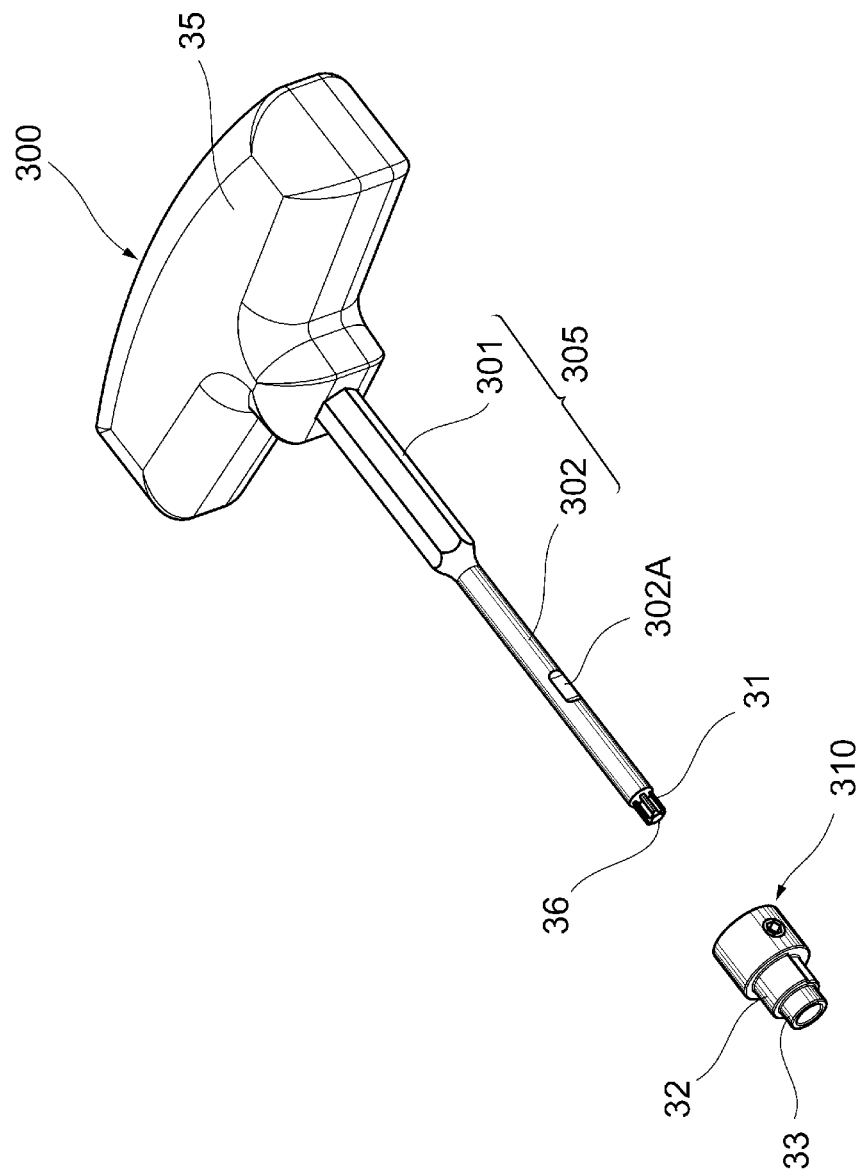
FIG. 23 is an exploded perspective view of the tool of FIG. 21

The tool (hereinafter referred to as a driver) 300 in this embodiment has the rotational axis B extending from the leading end 36 side to the base end side, as shown in FIG. 22. As shown in FIGS. 21 to 23, the driver 300 comprises a shaft 305, the torque transmitting portion 31 formed on the leading end 36 side of the shaft 35, a separate portion 310 which is removably mounted on the shaft 305 and the gripping part 35 which is formed on a base end side of the shaft 305. FIG. 23 shows a state in which the separate portion 310 has been detached from a small diameter part 302. The shaft 305 comprises a large diameter part 301 and the small diameter part 302 which are arranged in series along the rotational axis B. Flat parts 302A, with which respective leading end surfaces of fastening screws 312, which will be described below, come into contact, are formed in an outer periphery of the small diameter part 302.

Figure 24:
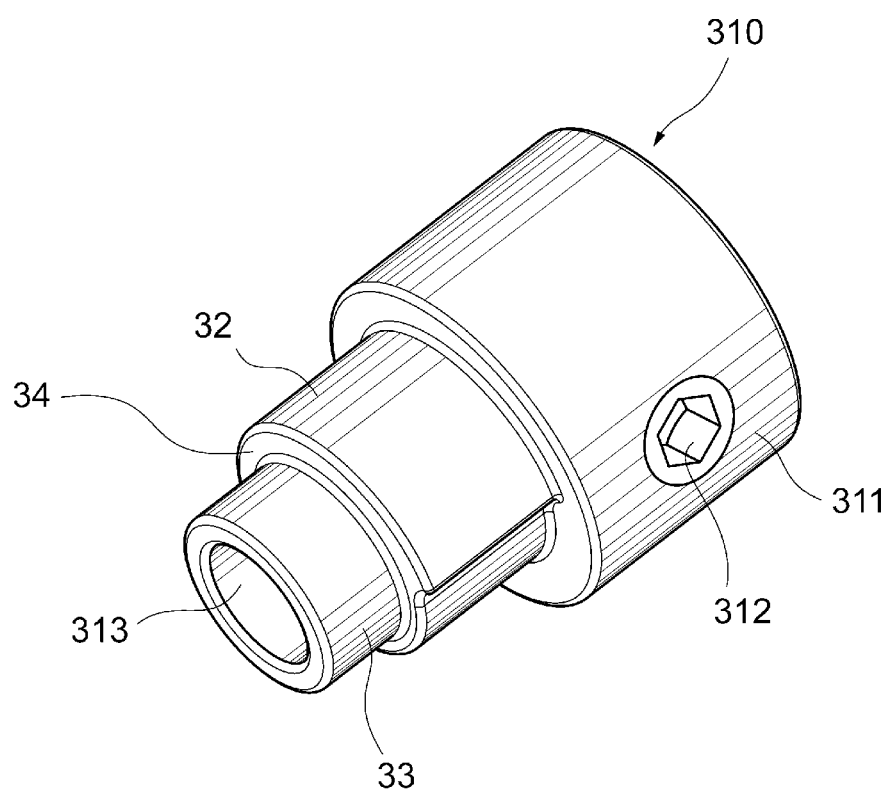
FIG. 24 is a perspective view of a separate portion of the tool of FIG. 21.
Figure 25:
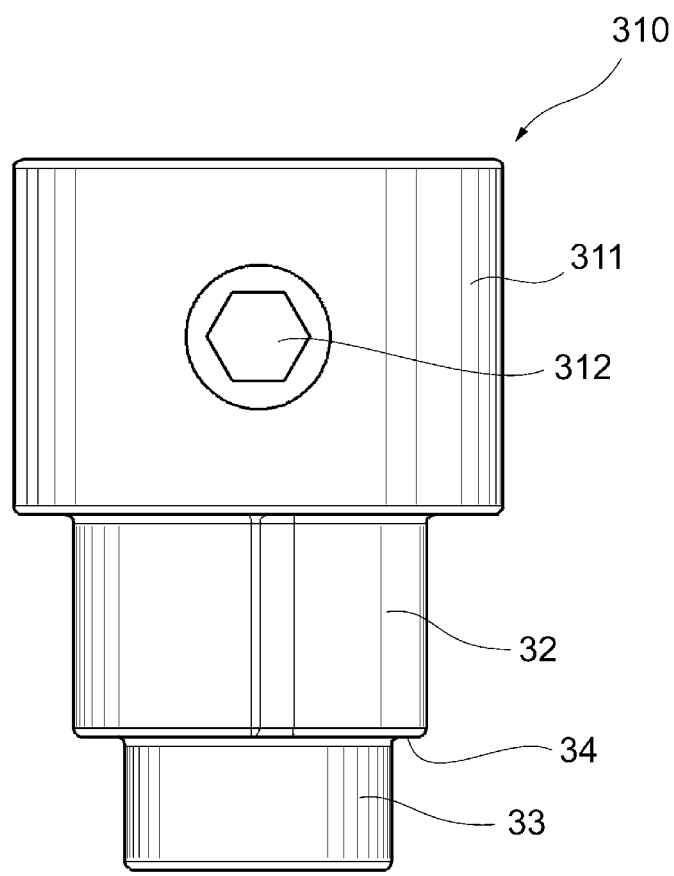
FIG. 25 is a plan view of the separate portion of FIG. 24.
Figure 26:
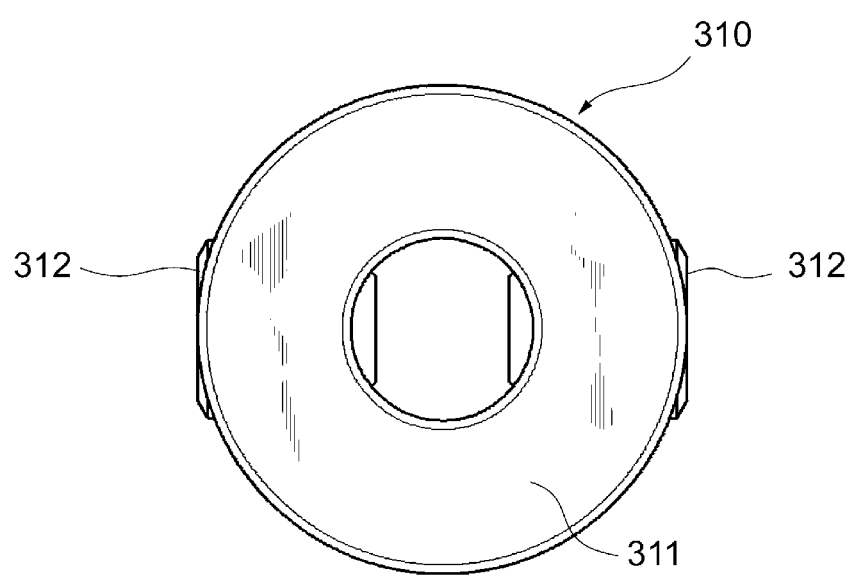
FIG. 26 is a back view of the separate portion of FIG. 24.
Figure 27:
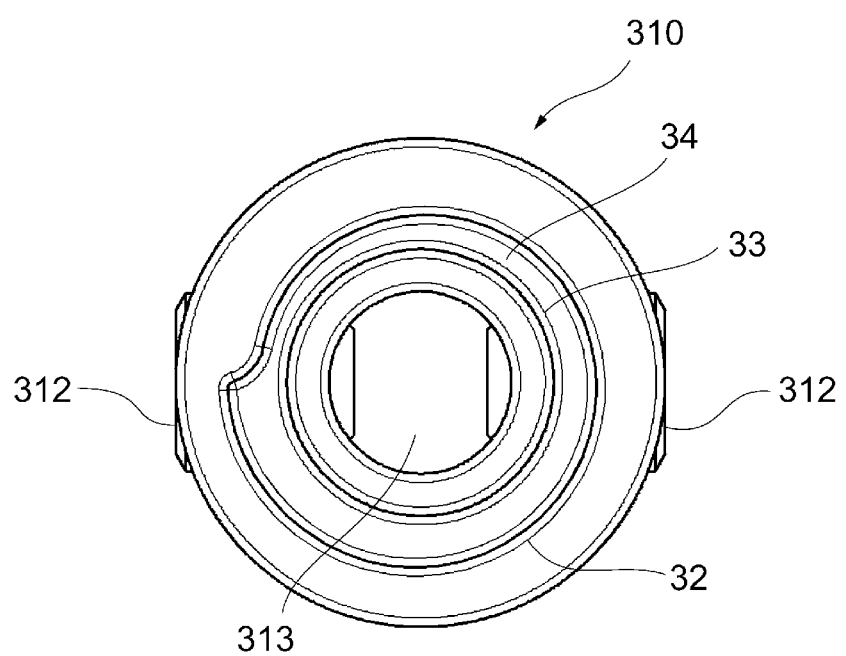
FIG. 27 is a front view of the separate portion of FIG. 24.

As shown in FIGS. 24 and 25, the separate portion 310 having a stepped cylindrical-shaped contour comprises the cylindrical column portion 33 having the minimum diameter, a cylindrical column portion 311 having the maximum diameter and the cam portion 32 which is located between the cylindrical column portions 33, 311, and such separate portion 310 is provided with a through hole 313 along the longitudinal direction. An end surface of the cam portion 32 which faces toward the cylindrical column portion 33 serves as the contact end surface 34. By fitting the separate portion 310 on the small diameter part 302 of the shaft 305, and by, as shown in FIGS. 26 and 27, screwing the fastening screws 312 into a pair of screw holes formed along the radial direction of the cylindrical column portion 311, respective leading ends of the fastening screws 312 press the flat parts 302A formed in the small diameter part 302 of the shaft 305, whereby the separate portion 310 is fixed to the small diameter part 302 while being prevented from being rotated around the rotational axis B.

With the driver 300 of this embodiment, since the shaft 305 and the separate portion 310 are configured separately, the profile of the outer peripheral surface of the cam portion 32 can be varied by only replacing the separate portion 310 with another. Further, guide recessed parts 22 having various shapes can be dealt with by only replacing the separate portion 310 with another. Even when the cam portion 32, the cylindrical column portion 33 and the contact end surface 34 are deformed or damaged due to wear, etc., this situation can be dealt with by only replacing the separate portion 310 without the need to discard the driver 300 in its entirety.

In the embodiment shown in FIG. 21, etc., as to the driver 300, it is possible to replace a portion thereof which includes the cam portion 32, the cylindrical column portion 33 and the contact end surface 34, but the configuration is not limited thereto in the present invention. For example, it may further be possible to replace the shaft leading end portion, in its entirety, of the driver 300, which includes the torque transmitting portion 31 (for example, the small diameter part 302 in its entirety in FIG. 21), and alternatively, it may be possible to replace the shaft, in its entirety, which excludes the gripping part 35 (for example, the shaft 305 in its entirety in FIG. 21).

In the above-described embodiments, the present invention has been described specifically in a given way, but the present invention is not limited to the described embodiments. It should be appreciated that various alterations and changes can be made to the present invention without departing from the gist and scope of the invention defined in the claims. The present invention encompasses all kinds of modifications, applications and equivalents that are encompassed by the idea of the present invention defined by the scope of the claims.

REFERENCE SIGNS LIST

1 Cutting tool
10 Cutting insert
11 Cutting edge
12 Inclined part
20 Tool body
21 Insert mounting part
22 Guide recessed part (engagement part)
23 Curved inner wall portion
24 Second contact end surface
25 Elastic wall portion
25A First contact inclined surface
25B Second contact inclined surface
26 Abutment part
27 Threaded hole
27A Extended diameter part
27B Screw part
A Rotational axis of the cutting tool
d Amount of adjustment 30 Tool (driver)
31 Torque transmitting portion
32 Cam portion
33 Cylindrical column portion
34 Contact end surface
35 Gripping part
36 Leading end
B Rotational axis of the tool
40 Fastening screw
41 Torque receiving portion (torque transmitted portion)
42 Screw part
43 Wedge part (tapered part)
300 Tool (driver)
310 Separate portion

What is claimed is:

1. A tool in which a leading end thereof is provided with a force transmitting portion and for which a rotational axis extending from the leading end to a base end thereof is defined,
wherein the tool further comprises a cam portion which is arranged closer to the base end than the force transmitting portion, and
the cam portion including an outer peripheral surface having a radius that varies constantly around the entire outer peripheral surface.

2. The tool according to claim 1, wherein a dimension from an outer peripheral surface of the cam portion to the rotational axis varies in proportion to the angle at which the cam portion is rotated around the rotational axis.

3. The tool according to claim 1, further comprising at least one cylindrical column portion for which a dimension from an outer peripheral surface thereof to the rotational axis is substantially constant.

4. The tool according to claim 1, further comprising a contact end surface facing toward the leading end,
wherein the contact end surface is at least part of a shape of rotational symmetry about the rotational axis.

5. The tool according to claim 4, wherein the contact end surface is arranged between the force transmitting portion and the cam portion.

6. The tool according to claim 4, wherein the contact end surface is at least part of a substantially conical surface.

7. The tool according to claim 1, wherein:
the tool is a driver or a wrench for removably mounting a cutting insert on a tool body of a cutting tool; and
the force transmitting portion is a torque transmitting portion.

8. The tool according to claim 7, wherein a shape of engagement of the force transmitting portion with a torque transmitted portion is selected from either a hexagonal star shape or a hexagonal shape.

9. The tool according to claim 1, wherein a portion thereof including at least the cam portion is a separate portion which is removable from the other portion thereof.

10. An adjustment mechanism for adjusting a position of a cutting edge of a cutting insert which is removably mounted on an insert mounting part of a tool body or a cartridge in a cutting tool, the adjustment mechanism comprising:
a tool for which a rotational axis extending from a leading end thereof to a base end thereof is defined, the tool comprising a cam portion including an outer peripheral surface having a radius that varies constantly around the entire outer peripheral surface; and
an engagement part which is provided so as to be adjacent to the insert mounting part or the cartridge in the tool body and which is configured so as to be capable of being engaged with the tool such that the tool is capable of being rotated around the rotational axis,
wherein, in a state in which the cutting insert or the cartridge is arranged so as to be movable, the tool is rotated in the engagement part around the rotational axis, whereby the cam portion acts so as to move the cutting insert or the cartridge.

11. The adjustment mechanism according to claim 10, wherein the tool further comprises a force transmitting portion which is formed at the leading end so as to impart a force to a fixing member which is mounted on the tool body so as to fix the cutting insert to the insert mounting part.

12. The adjustment mechanism according to claim 10, wherein:
the engagement part is adjacent to the insert mounting part; and
the tool directly comes into contact with the cutting insert.

13. The adjustment mechanism according to claim 10, wherein the tool is a portion including at least the cam portion, the portion being a separate portion which is removable from another portion.

14. A tool body of a cutting tool comprising an insert mounting part on which a cutting insert is removably mounted, the tool body comprising
an engagement part which is capable of being engaged with a tool such that the tool having a force transmitting portion for imparting a force to a fixing member which is mounted on the tool body so as to fix the cutting insert to the insert mounting part is capable of being rotated around the rotational axis, the tool comprising a cam portion for which a dimension from an outer peripheral surface of the tool to the rotational axis extending from a leading end of the tool to a base end thereof varies in accordance with an angle at which the cam portion is rotated around the rotational axis, the cam portion being closer to the base end than the force transmitting portion,
wherein, in a state in which the cutting insert is arranged so as to be movable in the insert mounting part, the tool is rotated in the engagement part around the rotational axis, whereby the cam portion acts so as to move the cutting insert.

15. The tool body according to claim 14, wherein the cam portion directly or indirectly acts on the cutting insert via rotation of the tool in the engagement part.

16. The tool body according to claim 14, wherein:
the tool further comprises a cylindrical column portion between the force transmitting portion and the cam portion; and
the engagement part comprises a curved inner wall portion which is engaged with the cylindrical column portion such that, when the engagement part is engaged with the tool, the tool is capable of being rotated around the rotational axis.

17. The tool body according to claim 14, wherein:
the tool further comprises a contact end surface; and
the engagement part comprises a second contact end surface which comes into contact with the contact end surface such that, when the engagement part is engaged with the tool, the tool is capable of being rotated around the rotational axis.

18. The tool body according to claim 14, wherein:
the insert mounting part further comprises an elastic wall portion; and engagement with the fixing member causes the elastic wall portion to be elastically deformed toward a side where the cutting insert is arranged on the insert mounting part.

19. A cutting tool comprising:

the tool body according to claim 14; and a cutting insert which is removably mounted on the insert mounting part of the tool body.

* * * * *